US010961142B1

(12) United States Patent
Ergas et al.

(10) Patent No.: US 10,961,142 B1
(45) Date of Patent: Mar. 30, 2021

(54) SYSTEMS AND PROCESSES FOR WASTEWATER TREATMENT

(71) Applicant: University of South Florida, Tampa, FL (US)

(72) Inventors: Sarina Ergas, Tampa, FL (US); Meng Wang, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 0 days.

(21) Appl. No.: 16/160,126

(22) Filed: Oct. 15, 2018

Related U.S. Application Data

(60) Provisional application No. 62/598,142, filed on Dec. 13, 2017.

(51) Int. Cl.
| | |
|---|---|
| *C02F 3/32* | (2006.01) |
| *C02F 1/42* | (2006.01) |
| *B01J 39/14* | (2006.01) |
| *C02F 101/16* | (2006.01) |

(52) U.S. Cl.
CPC ............ *C02F 3/322* (2013.01); *B01J 39/14* (2013.01); *C02F 1/42* (2013.01); *C02F 2001/425* (2013.01); *C02F 2101/16* (2013.01)

(58) Field of Classification Search
CPC ...... C02F 3/322; C02F 1/42; C02F 2001/425; C02F 2101/16; B01J 39/14
USPC ................................ 210/602, 660, 667, 681
See application file for complete search history.

(56) References Cited

U.S. PATENT DOCUMENTS

| | | | |
|---|---|---|---|
| 4,098,690 A | 7/1978 | Semmens | |
| 4,695,387 A | 9/1987 | Berry et al. | |
| 6,024,850 A * | 2/2000 | Sampson | B01D 61/48 |
| | | | 204/296 |
| 6,033,559 A * | 3/2000 | Bender | C02F 3/10 |
| | | | 210/150 |
| 6,682,578 B2 | 1/2004 | Sower | |
| 6,878,284 B2 * | 4/2005 | Hasegawa | B01J 20/18 |
| | | | 210/660 |
| 10,138,143 B1 * | 11/2018 | Alcantar | C02F 1/66 |
| 2003/0034299 A1 * | 2/2003 | Moghe | C02F 1/5245 |
| | | | 210/601 |
| 2012/0028338 A1 * | 2/2012 | Bhatnagar | C02F 3/322 |
| | | | 435/257.3 |

(Continued)

OTHER PUBLICATIONS

Aponte-Morales, Ammonium Removal from High Strength Wastewater Using a Hybrid Ion Exchange Biological Process. PhD Dissertation, University of South Florida, USA, 2015.

(Continued)

*Primary Examiner* — Fred Prince
(74) *Attorney, Agent, or Firm* — Thomas|Horstemeyer, LLP

(57) ABSTRACT

The disclosure, in one aspect, relates to hybrid ion-exchange and algae photosynthesis systems and processes for algae cultivation and treatment of high $NH_4^+$ concentration wastewater. The disclosed systems and methods can be further optimized using a disclosed mathematical model that can predict the hybrid ion-exchange and algae photosynthesis process including temporal evolution of the $NH_4^+$ concentration. This abstract is intended as a scanning tool for purposes of searching in the particular art and is not intended to be limiting of the present invention.

19 Claims, 13 Drawing Sheets

(56) References Cited

U.S. PATENT DOCUMENTS

| | | | | |
|---|---|---|---|---|
| 2012/0061315 | A1* | 3/2012 | Grott | C02F 1/76 |
| | | | | 210/601 |
| 2013/0017415 | A1* | 1/2013 | He | H01M 8/16 |
| | | | | 429/2 |
| 2014/0008303 | A1* | 1/2014 | Boyer | B01J 47/022 |
| | | | | 210/670 |
| 2015/0001149 | A1* | 1/2015 | Kuehnle | C02F 3/28 |
| | | | | 210/601 |
| 2018/0002183 | A1* | 1/2018 | Davis | B01J 29/70 |
| 2018/0327293 | A1* | 11/2018 | Smith | C02F 3/307 |

OTHER PUBLICATIONS

Aponte-Morales et al., Nitrogen removal from anaerobically digested swine waste centrate using a laboratory-scale chabazite-sequencing batch reactor. Environmental Engineering Science, 33(5), 324-332, 2016.

Cantrell et al., Livestock waste-to-bioenergy generation opportunities. Bioresource Technology, 99(17), 7941-7953, 2008.

Ciudad et al., Partial nitrification of high ammonia concentration wastewater as a part of a shortcut biological nitrogen removal process. Process Biochemistry, 40(5), 1715-1719, 2005.

Crofts, Uptake of ammonium ion by chloroplasts, and its relation tophotophosphorylation. Biochemical and biophysical research communications, 24(5), 725-731, 1966.

Fux et al., Efficient and stable nitritation and denitritation of ammonium-rich sludge dewatering liquor using an SBR with continuous loading. Water Research, 40(14), 2765-2775, 2006.

Halfhide et al., Growth of an indigenous algal consortium on anaerobically digested municipal sludge centrate: photobioreactor performance and modeling. BioEnergy Research, 8(1), 249-258, 2015.

Kjeldsen et al., Present and Long-Term Composition of MSW Landfill Leachate: A Review. Critical Reviews in Environmental Science and Technology, 32(4), 297-336, 2002.

Kumar et al., Co-existence of anammox and denitrification for simultaneous nitrogen and carbon removal—Strategies and issues. Journal of Hazardous Materials, 178(1-3), 1-9, 2010.

Lee et al., Integrated co-limitation kinetic model for microalgae growth in anaerobically digested municipal sludge centrate. Algal Research, 18, 15-24, 2016.

Li et al., Characterization of a microalga *Chlorella* sp. well adapted to highly concentrated municipal wastewater for nutrient removal and biodiesel production. Bioresource technology, 102(8), 5138-5144, 2011.

Malovanyy et al., Concentration of ammonium from municipal wastewater using ion exchange process. Desalination, 329(0), 93-102, 2013.

Martins et al., Ammonium removal from landfill leachate by Clinoptilolite adsorption followed by bioregeneration. Journal of Environmental Chemical Engineering, 5(1), 63-68, 2017.

Park et al., Ammonia removal from anaerobic digestion effluent of livestock waste using green alga *Scenedesmus* sp. Bioresource Technology, 101(22), 8649-8657, 2010.

Rožić et al., Ammoniacal nitrogen removal from water by treatment with clays and zeolites. Water Research, 34(14), 3675-3681, 2000.

Ruiz et al., Nitrification-denitrification via nitrite accumulation for nitrogen removal from wastewaters. Bioresource Technology, 97(2), 330-335, 2006.

Rusten et al., Microalgae growth for nutrient recovery from sludge liquor and production of renewable bioenergy. Water Science and Technology, 64(6), 1195-1201, 2011.

Tada et al., Effect of natural zeolite on methane production for anaerobic digestion of ammonium rich organic sludge. Bioresource Technology, 96(4), 459-464, 2005.

Udert et al., Nitrification and autotrophic denitrification of source-separated urine. Water Science and Technology, 48(1), 119-130, 2003.

Wang et al., Investigation of anaerobic digestion of *Chlorella* sp. and *Micractinium* sp. grown in high-nitrogen wastewater and their co-digestion with waste activated sludge. Biomass and Bioenergy, 80, 30-37, 2015.

Wang et al., A novel shortcut nitrogen removal process using an algal-bacterial consortium in a photo-sequencing batch reactor (PSBR). Water Research, 87, 38-48, 2015.

Wang et al., Natural zeolites as effective adsorbents in water and wastewater treatment. Chemical Engineering Journal, 156(1), 11-24, 2010.

Wett et al., Impacts of separate rejection water treatment on the overall plant performance. Water Science and Technology, 48(4), 139-146, 2003.

Yuan et al., Microalgae growth using highstrength wastewater followed by anaerobic co-digestion. Water Environment Research, 84(5), 396-404, 2012.

Zalivina et al., Economic and Energy-Efficient Nitrogen Removal From High Ammonia Strength Wastewater Using Algae, Bacteria, and Ion Exchange, Science Trends, Nov. 12, 2018 (https://sciencetrends.com/economic-and-energy-efficient-nitrogen-removal-from-high-ammonia-strength-wastewater-using-algae-bacteria-and-ion-exchange/).

Sarioglu, Removal of Ammonium from municipal wastewater using natural Turkish (Dogantepe) zeolite, Separation and Purification Technology 41, 1-11, 2005.

Deng, Ammonia Removal and Recovery from Wastewater Using Natural Zeolite: An Integrated System for Regeneration by Air Stripping Followed Ion Exchange; Thesis, University of Waterloo, Waterloo, Ontario, Canada (Jan. 23, 2014).

Wang et al., Hybrid Algal Photosynthesis and Ion-Exchange (HAPIX) Process for Side Stream Wastewater Treatment; WEF Nutrient Symposium Jun. 12-14, 2017; Ft. Lauderdale, FL.

Wang et al., Experimental and Modeling of a Hybrid Algal Photosynthesis and Ion-Exchange (HAPIX) Process for Side Stream Wastewater Treatment, 2017.

Wang et al., Nutrient and Energy Recovery from Different Waste Streams, 2017.

* cited by examiner

SYSTEMS AND PROCESSES FOR WASTEWATER TREATMENT

CROSS-REFERENCE TO RELATED APPLICATIONS

This Application claims the benefit of U.S. Provisional Application No. 62/598,142, filed on Dec. 13, 2017, which is incorporated herein by reference in its entirety.

STATEMENT REGARDING FEDERALLY SPONSORED RESEARCH OR DEVELOPMENT

This invention was made with U.S. Government support under grant numbers 1511439 and 1243510, awarded by National Science Foundation. The U.S. government has certain rights in the invention.

BACKGROUND

Management of the nitrogen (N) cycle was identified by the National Academy of Engineering (NAE) as one of the grand challenges of the $21^{st}$ century. In particular, high $NH_4^+$ strength wastewaters, such as industrial wastewaters (e.g., food processing, fertilizer, plastic industries), landfill leachate, source separated urine and centrate from anaerobic digestion, are challenging and expensive to treat (Kjeldsen et al., 2002; Udert et al., 2003). Anaerobic digestion centrate is of particular interest since anaerobic digestion technology is being promoted for stabilization and bioenergy recovery from waste resources (Cantrell et al., 2008). The high $NH_4^+$ strength centrate is often recycled back to the head of the wastewater treatment plant, resulting in high irregular nutrient loads that can upset mainstream biological and removal ("BNR") processes and increase costs (Fux et al., 2006; Wett & Alex, 2003).

Although a number of advanced BNR processes, such as shortcut nitrification-denitrification and anaerobic ammonium oxidation (anammox), have been developed to reduce the energy and chemical costs of high $NH_4^+$ strength wastewater treatment (Ciudad et al., 2005; Kumar & Lin, 2010; Ruiz et al., 2006), utilization of algae for treatment of these wastewater presents an opportunity for co-production of biofuels, high value chemicals and animal feeds (Li et al., 2011; Park et al., 2010; Rusten & Sahu, 2011; Wang & Park, 2015; Wang et al., 2015). The high nutrient concentrations in these wastewaters also have the potential to support higher algal biomass densities than low-strength wastewaters, resulting in lower downstream costs for thickening and dewatering (Halfhide et al., 2015). A challenge with this approach is that $NH_4^+$—N concentrations greater than 200 to 300 mg/L are known to inhibit algae growth due to the uncoupling effect of free $NH_3$ on photosynthetic processes in chloroplasts (Crofts, 1966; Park et al., 2010). Prior studies have addressed this issue by either dilution with fresh water or low strength wastewater (Yuan et al., 2012) or using reactor configurations that reduce the $NH_3$ concentrations that algae are exposed to (Halfhide et al., 2015).

Zeolites are natural hydrated aluminosilicate materials with a high affinity for $NH_4^+$ ions (Malovanyy et al., 2013; Rožić et al., 2000). Common forms of natural zeolite include clinoptilolite, mordenite, phillipsite, chabazite, stilbite, analcime and laumontite (Wang & Peng, 2010). Clinoptilolite is the most abundant and lowest cost natural zeolite material; however, its $NH_4^+$ capacity is low compared with chabazite (Aponte-Morales, 2015. Prior studies of biological treatment of high $NH_4^+$ strength wastewaters have successfully used the ion exchange capacity of natural zeolites to reduce the toxicity of free $NH_3$ to nitrifying prokaryotes (Aponte-Morales et al., 2016; Martins et al., 2017; Tada et al., 2005); however, this approach has not been previously used with algae.

Despite extensive research on treatment of wastewater streams, there remains a need in the industry for treatment systems that readily utilize high $NH_4^+$ concentration wastewater streams without requiring dilution with fresh water or low strength wastewater to decreases the $NH_4^+$ concentration, or without requiring recycling high $NH_4^+$ concentration wastewater stream back to the head of the wastewater treatment plant. Moreover, due to the utility and economic value of algae, systems are required that are able to utilize high $NH_4^+$ concentration wastewater stream in conjunction with algae growth. These needs and other needs are addressed in the present disclosure.

SUMMARY

In accordance with the purpose(s) of the present disclosure, as embodied and broadly described herein, the disclosure, in one aspect, relates to hybrid ion-exchange and algae photosynthesis systems and processes for algae cultivation and treatment of high $NH_4^+$ concentration wastewater.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2A shows representative cation concentration data versus time in a representative disclosed hybrid ion-exchange and algae photosynthesis process reactor system (charged with 150 g/L chabazite). FIG. 2B shows representative cation concentration data versus time in a control ion exchange control reactor system.

FIG. 4A shows data obtained after a first phase of growth ("Phase 1"), and FIG. 4B shows data obtained after a third phase of growth ("Phase 3").

FIG. 7A shows representative cation concentration data obtained in a hybrid ion-exchange and algae photosynthesis process reactor system charged with 60 g/L chabazite. FIG. 7B shows representative cation concentration data obtained in a hybrid ion-exchange and algae photosynthesis process reactor system charged with 150 g/L chabazite. FIG. 7C shows representative cation concentration data obtained in a hybrid ion-exchange and algae photosynthesis process reactor system charged with 250 g/L chabazite.

FIG. 9A shows a representative single stage process comprising mixing with a wastewater stream, such as a centrate, together an ion exchange material, such as zeolite, and an inoculum comprising microbial consortium, such as one comprising one or more algal species and one or more bacterial species. FIG. 9B shows a representative two stage process comprising first mixing with a wastewater stream, such as a centrate, together an ion exchange material, such as zeolite. After a suitable period of time, the ion exchange material is separated from the liquid mixture, and the liquid is removed. To the removed liquid is then added an inoculum comprising microbial consortium, such as one comprising one or more algal species and one or more bacterial species.

FIG. 11A shows data obtained with a single-stage process as described above in FIG. 10. FIG. 11B shows data obtained with a two-stage process as described above in FIG. 10.

Figure 1:
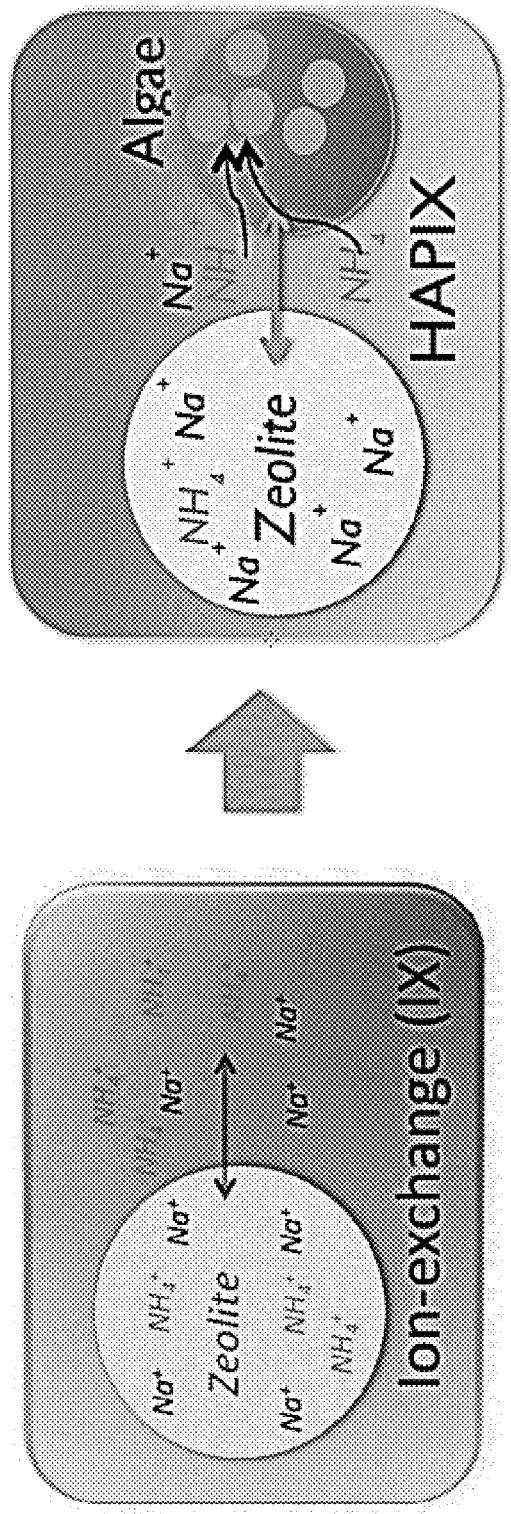
FIG. 1 shows a schematic representation of a conceptual model of a disclosed hybrid ion-exchange and algae photosynthesis process. The schematic shows aspects of a combination of ion exchange and algal photosynthesis.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The disclosures herein will be described more fully hereinafter with reference to the accompanying drawings, in which some, but not all possible embodiments are shown. Indeed, disclosures may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

It is also to be understood that the terminology used herein is for the purpose of describing particular aspects only and is not intended to be limiting. As used in the specification and in the claims, the term "comprising" can include the aspect of "consisting of." Unless defined otherwise, all technical and scientific terms used herein have the same meaning as commonly understood by one of ordinary skill in the art to which the disclosed compositions and methods belong. In this specification and in the claims which follow, reference will be made to a number of terms which shall be defined herein.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

Prior to describing the various embodiments, the following definitions are provided and should be used unless otherwise indicated.

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

As used herein, "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples encompassed by the terms "consisting essentially of" and "consisting of." Similarly, the term "consisting essentially of" is intended to include examples encompassed by the term "consisting of."

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" zeolite is interpreted to include one or more zeolite molecules of the zeolite, where the zeolite molecules may or may not be identical (e.g., different molecular weights and/or isomers).

It should be noted that ratios, concentrations, amounts, and other numerical data can be expressed herein in a range format. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'". It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.4%, 3.2%, and 4.4%) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of a zeolite refers to an amount that is sufficient to achieve the desired improvement in the property modulated by the formulation component, e.g., achieving the desired reduction in $NH_4^+$—N in a centrate stream. The specific level in terms of concentration (e.g., g/L) in a formulation required as an effective amount will depend upon a variety of factors the centrate source, particular species of algae used, temperature, and reactor or digester design.

As used herein, the terms "optional" or "optionally" means that the subsequently described event or circumstance can or cannot occur, and that the description includes instances where said event or circumstance occurs and instances where it does not.

As used herein, the term "centrate" refers to a solids depleted waste stream. For example, a waste stream can be digested and then the effluent slurry be de-watered forming a sludge or biosolids cake (the solids-rich stream) along with a liquid stream often called a (the solids-depleted stream).

As used herein, the term "HAPIX" is an abbreviation for "hybrid ion-exchange and algal photosynthesis," a disclosed process for treatment of a side stream centrate from an anaerobic digester treated waste activated sludge.

As used herein, the term "zeolite" refers to both natural zeolites and synthetic zeolites comprising a negatively charged frame work silicate formed from interlocking tetrahedrons of $SiO_4$ and $AlO_4$. Zeolites have relatively large spaces or channels that allow molecules to pass through.

Unless otherwise specified, temperatures referred to herein are based on atmospheric pressure (i.e. one atmosphere).

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

Algae

In some aspects, the disclosed systems and processes comprise an algae, e.g., an oxygen-releasing, photosynthetic algae. In a further aspect, the disclosed processes comprise a green algae, e.g., an organism in the phylum Chlorophyta or Charophyta. In certain aspects, the disclosed processes comprise a microalgae. In various aspects, the disclosed processes comprise a macroalgae. As used herein, it is understood that "algae" refers collectively to a eukaryotic organism that contains chlorophyll and is capable of carrying out photosynthesis.

In some aspects, the disclosed processes further comprise a photosynthetic cyanobacteria. That is, in some aspects, the disclosed processes can comprise a eukaryotic organism as described herein above and a cyanobacteria. It is understood that a disclosed process further comprising a "photosynthetic cyanobacteria" means one or more species, strains, or isolates of cyanobacteria. In a further aspect, the photosynthetic cyanobacteria is selected from *Spirulina* spp., *Prochlorococcus* spp., *Synechococcus* spp., *Synechocystis* spp, *Nostoc* spp., *Oscillatoria* spp., *Phormidium* spp., *Microcoleus* spp., *Mastigocladus* spp., combinations thereof, including combinations of isolates or strains of the foregoing genera. In a still further aspect, the photosynthetic cyanobacteria is genetically modified or engineered. For example, in some aspects, the photosynthetic cyanobacterium is a genetically engineered Synechococcus strain. In a still further aspect, the photosynthetic cyanobacteria can be a filamentous photosynthetic cyanobacteria. In various further aspects, the photosynthetic cyanobacteria can be a motile photosynthetic cyanobacteria.

In some aspects, the disclosed processes comprise inoculating wastewater with a heterogeneous mixture of one or more strain or species of algae. That is, the one or more strain or species of algae are not laboratory isolates or substantially pure cultures of algae. In a still further aspect, the heterogeneous mixture of one or more strain or species of algae can further comprise one or more heterogeneous mixtures of a non-algae microbial strain or species. In various aspects, the heterogeneous mixture of one or more strain or species of algae can be obtained from an environmental or field sample that is not a pure culture, e.g., obtained from a wastewater treatment facility. In a still further aspect, the mixed culture of algae can further comprise heterogeneous cultures of a non-algae microbial strain or species.

In some aspects, the composition of the heterogeneous mixture of one or more strain or species of algae can change following inoculation such that the relative proportions of specific strains and/or species of algae and other microbes are different in the culture following inoculation and growth compared to the relative proportions of specific strains and/or species of algae and other microbes found in the inoculating mixture. That is, a process can be inoculated with a heterogeneous mixture of one or more strain or species of algae, optionally comprising one or more impure or heterogeneous mixtures of non-algae microbial strains or species, and following inoculation, as a function of time, the relative proportions of specific strains and/or species of algae and other microbes are modified as a result of growth in the wastewater stream.

In some aspects, the disclosed processes comprise inoculating wastewater with a substantially pure culture of algae. In a further aspect, the substantially pure culture of algae can comprise two or more substantially pure cultures of different algae strains or species. In a still further aspect, the substantially pure culture of algae can further comprise one or more substantially pure cultures of a non-algae microbial strains or species. In some aspects, the composition of the algae culture can change following inoculation with the relative proportions of specific strains and/or species of algae and other microbes changing in the culture following inoculation. That is, a process can be inoculated with a substantially pure culture or a mixture of substantially pure cultures of algae, optionally comprising one or more substantially pure cultures of non-algae microbial strains or species, and during the process, as a function of time, the relative proportions of specific strains and/or species of algae and other microbes can change in the culture following inoculation.

In some aspects, the disclosed processes comprise a *Chiorella* sp. In a further aspect, the disclosed processes comprise *Chiorella* sp. including, but not limited to, *Chiorella antartica, Chiorella autotrophica, Chiorella chiorelloides, Chiorella coloniales, Chiorella ellipsoidea, Chiorella elongata, Chiorella emersonii, Chiorella heliozoae, Chiorella lewinii, Chiorella minutissima, Chiorella neustonica, Chiorella parva, Chiorella pituita, Chiorella prothothecoides, Chiorella puichelloides, Chiorella pyrenoidosa, Chiorella regularis, Chiorella rotunda, Chiorella saccharophila, Chiorella salina, Chiorella singularis, Chiorella sorokiniana, Chiorella variabilis, Chiorella volutis, Chiorella vulgaris, Chiorella zofinigiensis*, or mixture of two or more of the foregoing *Chiorella* species. In a still further aspect, the disclosed processes comprise one or more strains of *Chiorella vulgaris*.

In some aspects, the disclosed processes comprise inoculating wastewater with a substantially pure culture of *Chiorella* sp. In a further aspect, the substantially pure culture of *Chiorella* sp. can comprise two or more substantially pure cultures of different algae strains or species, including two or more substantially pure cultures of *Chiorella* sp. In a still further aspect, the substantially pure culture of *Chiorella* sp. can further comprise one or more substantially pure cultures of a non-algae microbial strain or species.

In some aspects, the disclosed processes comprise inoculating wastewater with a heterogeneous mixture of one or more strain or species of *Chiorella* sp. That is, the one or more strain or species of *Chiorella* sp. are not laboratory isolates or substantially pure cultures of *Chiorella* sp. In a still further aspect, the heterogeneous mixture of one or more strain or species of *Chiorella* sp. can further comprise one or heterogeneous mixtures of a non-algae microbial strain or species.

In some aspects, the disclosed processes comprise an algae one or more species of microorganism in addition to the given algae, including, but not limited to, *Acaryochioris* sp., *Amphora* sp., *Anabaena* sp., *Anacystis* sp., *Anikstrodesmis* sp., *Asteromonas* sp., *Azoarcus* sp., *Bacillus* sp., *Botryococcus* sp., *Chaetoceros* sp., *Chiorella* sp., *Chiorococcum* sp., *Closterium* sp., *Crocosphaera* sp., *Cyanotheca* sp., *Cyclotella* sp., *Cylindrotheca* sp., *Desmodesmus* sp., *Dunaliella* sp., *Escherichia* sp., *Euglena* sp., *Halobacterium* sp., *Halomonas* sp., *Halospirulina* sp., *Hematococcus* sp., *Isochrysis* sp., *Lyngbya* sp., *Marinichlorella* sp., *Micratinium* sp., *Microcystis* sp., *Monochrysis* sp., *Monoraphidium* sp., *Nannochloris* sp., *Nannochlorum* sp., *Nannochloropsis* sp., *Navicula* sp., *Nephrochloris* sp., *Nephroselmis* sp., *Nitrobacter* sp., *Nitrococcus* sp., *Nitrosococcus* sp., *Nitrosomonas* sp., *Nitrosopumilus* sp., *Nitrospina* sp., *Nitzschia* sp., *Nodularia* sp., *Nostoc* sp., *Oochromonas* sp., *Oocystis* sp., *Oscillatoria* sp., *Pavlova* sp., *Pediastrum* sp., *Phaeodactylum* sp., *Picochlorum* sp., *Platymonas* sp., *Pleurochrysis* sp., *Porphyra* sp., *Prochlorococcus* sp., *Pseudoanabaena* sp., *Pseudomonas* sp., *Pyramimonas* sp., *Rhodoceros* sp., *Rhodocyclus* sp., *Rhodomonas* sp., *Rubrivivax* sp., *Scenedesmus* sp., *Selenastrum* sp., *Spirulina* sp., *Stichococcus* sp., *Synechococcus* sp., *Synechocystis* sp., *Tetraselmi* sp.s, *Thalassiosira* sp., *Thermosynechocystis* sp., *Trichodesmium* sp., *Thiobacillus* sp., *Uronema* sp., *Zoogloea* sp., or two or more strains from one or more of the foregoing genera.

In some aspects, the disclosed processes comprise *Chiorella* sp. and one or more species of microorganism in addition to the *Chiorella* sp., including, but not limited to, *Acaryochioris* sp., *Amphora* sp., *Anabaena* sp., *Anacystis* sp., *Anikstrodesmis* sp., *Asteromonas* sp., *Azoarcus* sp., *Bacillus* sp., *Botryococcus* sp., *Chaetoceros* sp., *Chlorococcum* sp., *Closterium* sp., *Crocosphaera* sp., *Cyanotheca* sp., *Cyclotella* sp., *Cylindrotheca* sp., *Desmodesmus* sp., *Dunaliella* sp., *Escherichia* sp., *Euglena* sp., *Halobacterium* sp., *Halomonas* sp., *Halospirulina* sp., *Hematococcus* sp., *Isochrysis* sp., *Lyngbya* sp., *Marinichlorella* sp., *Micratinium* sp., *Microcystis* sp., *Monochrysis* sp., *Monoraphidium* sp., *Nannochloris* sp., *Nannochlorum* sp., *Nannochloropsis* sp., *Navicula* sp., *Nephrochloris* sp., *Nephroselmis* sp., *Nitrobacter* sp., *Nitrococcus* sp., *Nitrosococcus* sp., *Nitrosomonas* sp., *Nitrosopumilus* sp., *Nitrospina* sp., *Nitzschia* sp., *Nodularia* sp., *Nostoc* sp., *Oochromonas* sp., *Oocystis* sp., *Oscillatoria* sp., *Pavlova* sp., *Pediastrum* sp., *Phaeodactylum* sp., *Picochlorum* sp., *Platymonas* sp., *Pleurochrysis* sp., *Porphyra* sp., *Prochlorococcus* sp., *Pseudoanabaena* sp., *Pseudomonas* sp., *Pyramimonas* sp., *Rhodoceros* sp., *Rhodocyclus* sp., *Rhodomonas* sp., *Rubrivivax* sp., *Scenedesmus* sp., *Selenastrum* sp., *Spirulina* sp., *Stichococcus* sp., *Synechococcus* sp., *Synechocystis* sp., *Tetraselmi* sp.s, *Thalassiosira* sp., *Thermosynechocystis* sp., *Trichodesmium* sp., *Thiobacillus* sp., *Uronema* sp., *Zoogloea* sp., or two or more strains from one or more of the foregoing genera.

In various aspects, a non-algae microbial strains or species can comprise one or more bacterial or microbial strain such as an ammonia oxidizing bacterial or microbial strain or species. In a further aspect, a non-algae microbial strains or species can comprise one or more nitrite oxidizing bacterial or microbial strain or species. In a still further aspect, a non-algae microbial strains or species can comprise one or more ammonia oxidizing bacterial or microbial strain or species and one or more nitrite oxidizing bacterial or microbial strain or species.

Cation Exchange Materials

In some aspects, the disclosed systems and processes utilize a high capacity cation exchange media. In particular aspects, the high capacity cation exchange media preferentially binds or adsorbs ammonium ions ($NH_4^+$). Suitable high capacity cation exchange media include, but are not limited to, ion exchange resins and zeolites. Exemplary ion exchange resins include, but are not limited to, DOWEX™ resins (Dow Chemical Company, Inc., Midland, Mich.).

In some aspects, the zeolite utilized in the disclosed processes is a naturally occurring mineral, but it also can be a synthetically manufactured zeolite. Natural zeolites are much less expensive than synthetic zeolites, though synthetic zeolites would also work well in the disclosed processes and devices. Because natural sources of zeolites often contain mixtures of zeolites instead of one single zeolite and some zeolites share several common characteristics. Therefore, the term "zeolite", as used herein, will refer to one zeolite and also to a mixture of zeolites with the desired properties.

As used herein, "zeolite" refers to a crystalline, microporous, hydrated aluminosilicate minerals of tectosilicate typetectosilicate type, i.e., a three dimensional framework of interconnected tetrahedra, comprising aluminum, silicon, oxygen atoms, and alkali and/or alkaline earth metals. The composition of a zeolite, as used herein, is generally represented by the formula: $M_{2/z}[(SiO_2)_x(Al_2O_3)].nH_2O$, where M is any alkali or alkaline earth atom, z is the valence of M, x is the number of Si tetrahedron (varying from 2 to 10), and n is the number of water molecules (varying from 2 to 7) contained in the voids of the zeolite.

Suitable natural forms of zeolite include, but are not limited to, analcite, apophylhte, chabazite, clinoptilolite, erionite, faujasite, heulandite, inesite, laumontite, mordenite, natrohte, phillipsite, stilbite, and mixtures thereof. In a further aspect, the zeolite is chabazite, clinoptilolite, erionite, mordenite, and mixtures thereof. In a still further aspect, the zeolite is chabazite, clinoptilolite, and mixtures thereof. In a yet further aspect, the zeolite is chabazite. In an even further aspect, the zeolite is clinoptilolite. In a still further aspect, the zeolite is erionite. In a yet urther aspect, the zeolite mordenite. Suitable zeolites are commercially available from a variety of sources, including, but not limited to, chabazite (product code: ALZB-Ca) from St. Cloud Zeolite (Winston, N. Mex.).

In some aspects, the zeolite used in the disclosed processes has a particle size from about 100 µm to about 2500 µm. In a further aspect, the zeolite used in the disclosed processes has a particle size from about 100 µm to about 500 µm. In a still further aspect, the zeolite used in the disclosed processes has a particle size from about 500 µm to about 1000 µm. In a yet further aspect, the zeolite used in the disclosed processes has a particle size of about 100 µm, about 200 µm, about 300 µm, about 400 µm, about 500 µm, about 600 µm, about 700 µm, about 800 µm, about 900 µm, about 1000 µm, about 1100 µm, about 1200 µm, about 1300 µm, about 1400 µm, about 1500 µm, about 1600 µm, about 1700 µm, about 1800 µm, about 1900 µm, about 2000 µm, about 2100 µm, about 2200 µm, about 2300 µm, about 2400 µm, about 2500 µm, or any combination of the foregoing values, including any range comprising the foregoing values.

In some aspects, the zeolite used in the disclosed processes is a chabazite having a particle size from about 100 µm to about 2500 µm. In a further aspect, the chabazite used in the disclosed processes has a particle size from about 100 µm to about 500 µm. In a still further aspect, the chabazite used in the disclosed processes has a particle size from about 500 µm to about 1000 µm. In a yet further aspect, the chabazite used in the disclosed processes has a particle size of about 100 µm, about 200 µm, about 300 µm, about 400 µm, about 500 µm, about 600 µm, about 700 µm, about 800 µm, about 900 µm, about 1000 µm, about 1100 µm, about 1200 µm, about 1300 µm, about 1400 µm, about 1500 µm, about 1600 µm, about 1700 µm, about 1800 µm, about 1900 µm, about 2000 µm, about 2100 µm, about 2200 µm, about 2300 µm, about 2400 µm, about 2500 µm, or any combination of the foregoing values, including any range comprising the foregoing values.

In some aspects, the zeolite used in the disclosed processes is a clinoptilolite having a particle size from about 100 µm to about 2500 µm. In a further aspect, the clinoptilolite used in the disclosed processes has a particle size from about 100 µm to about 500 µm. In a still further aspect, the clinoptilolite used in the disclosed processes has a particle size from about 500 µm to about 1000 µm. In a yet further aspect, the clinoptilolite used in the disclosed processes has a particle size of about 100 µm, about 200 µm, about 300 µm, about 400 µm, about 500 µm, about 600 µm, about 700 µm, about 800 µm, about 900 µm, about 1000 µm, about 1100 µm, about 1200 µm, about 1300 µm, about 1400 µm, about 1500 µm, about 1600 µm, about 1700 µm, about 1800 µm, about 1900 µm, about 2000 µm, about 2100 µm, about 2200 µm, about 2300 µm, about 2400 µm, about 2500 µm, or any combination of the foregoing values, including any range comprising the foregoing values.

In some aspects, the zeolite used in the disclosed processes has an average pore diameter from about 1 Å to about 10 Å. In a further aspect, the zeolite used in the disclosed processes has a particle size from about 1 Å to about 5 Å. In a still further aspect, the zeolite used in the disclosed processes has a particle size from about 5 Å to about 10 Å. In a yet further aspect, the zeolite used in the disclosed processes has a particle size of about 1.0 Å, about 1.1 Å, about 1.2 Å, about 1.3 Å, about 1.4 Å, about 1.5 Å, about 1.6 Å, about 1.7 Å, about 1.8 Å, about 1.9 Å, about 2.0 Å, about 2.1 Å, about 2.2 Å, about 2.3 Å, about 2.4 Å, about 2.5 Å, about 2.6 Å, about 2.7 Å, about 2.8 Å, about 2.9 Å, about 3.0 Å, about 3.1 Å, about 3.2 Å, about 3.3 Å, about 3.4 Å, about 3.5 Å, about 3.6 Å, about 3.7 Å, about 3.8 Å, about 3.9 Å, about 4.0 Å, about 4.1 Å, about 4.2 Å, about 4.3 Å, about 4.4 Å, about 4.5 Å, about 4.6 Å, about 4.7 Å, about 4.8 Å, about 4.9 Å, about 5.0 Å, about 6.1 Å, about 6.2 Å, about 6.3 Å, about 6.4 Å, about 6.5 Å, about 6.6 Å, about 6.7 Å, about 6.8 Å, about 6.9 Å, about 7.0 Å, about 7.1 Å, about 7.2 Å, about 7.3 Å, about 7.4 Å, about 7.5 Å, about 7.6 Å, about 7.7 Å, about 7.8 Å, about 7.9 Å, about 8.0 Å, about 8.1 Å, about 8.2 Å, about 8.3 Å, about 8.4 Å, about 8.5 Å, about 8.6 Å, about 8.7 Å, about 8.8 Å, about 8.9 Å, about 9.0 Å, about 9.1 Å, about 9.2 Å, about 9.3 Å, about 9.4 Å, about 9.5 Å, about 9.6 Å, about 9.7 Å, about 9.8 Å, about 9.9 Å, about 10.0 Å, or any combination of the foregoing values, including any range comprising the foregoing values.

In some aspects, the zeolite used in the disclosed processes is a chabazite having an average pore diameter from about 1 Å to about 10 Å. In a further aspect, the chabazite used in the disclosed processes has a particle size from about 1 Å to about 5 Å. In a still further aspect, the chabazite used in the disclosed processes has a particle size from about 5 Å to about 10 Å. In a yet further aspect, the chabazite used in the disclosed processes has a particle size of about 1.0 Å, about 1.1 Å, about 1.2 Å, about 1.3 Å, about 1.4 Å, about 1.5 Å, about 1.6 Å, about 1.7 Å, about 1.8 Å, about 1.9 Å, about 2.0 Å, about 2.1 Å, about 2.2 Å, about 2.3 Å, about 2.4 Å, about 2.5 Å, about 2.6 Å, about 2.7 Å, about 2.8 Å, about 2.9 Å, about 3.0 Å, about 3.1 Å, about 3.2 Å, about 3.3 Å, about 3.4 Å, about 3.5 Å, about 3.6 Å, about 3.7 Å, about 3.8 Å, about 3.9 Å, about 4.0 Å, about 4.1 Å, about 4.2 Å, about 4.3 Å, about 4.4 Å, about 4.5 Å, about 4.6 Å, about 4.7 Å, about 4.8 Å, about 4.9 Å, about 5.0 Å, about 6.1 Å, about 6.2 Å, about 6.3 Å, about 6.4 Å, about 6.5 Å, about 6.6 Å, about 6.7 Å, about 6.8 Å, about 6.9 Å, about 7.0 Å, about 7.1 Å, about 7.2 Å, about 7.3 Å, about 7.4 Å, about 7.5 Å, about 7.6 Å, about 7.7 Å, about 7.8 Å, about 7.9 Å, about 8.0 Å, about 8.1 Å, about 8.2 Å, about 8.3 Å, about 8.4 Å, about 8.5 Å, about 8.6 Å, about 8.7 Å, about 8.8 Å, about 8.9 Å, about 9.0 Å, about 9.1 Å, about 9.2 Å, about 9.3 Å, about 9.4 Å, about 9.5 Å, about 9.6 Å, about 9.7 Å, about 9.8 Å, about 9.9 Å, about 10.0 Å, or any combination of the foregoing values, including any range comprising the foregoing values.

In some aspects, the zeolite used in the disclosed processes is a clinoptilolite having an average pore diameter from about 1 Å to about 10 Å. In a further aspect, the clinoptilolite used in the disclosed processes has a particle size from about 1 Å to about 5 Å. In a still further aspect, the clinoptilolite used in the disclosed processes has a particle size from about 5 Å to about 10 Å. In a yet further aspect, the clinoptilolite used in the disclosed processes has a particle size of about 1.0 Å, about 1.1 Å, about 1.2 Å, about 1.3 Å, about 1.4 Å, about 1.5 Å, about 1.6 Å, about 1.7 Å, about 1.8 Å, about 1.9 Å, about 2.0 Å, about 2.1 Å, about 2.2 Å, about 2.3 Å, about 2.4 Å, about 2.5 Å, about 2.6 Å, about 2.7 Å, about 2.8 Å, about 2.9 Å, about 3.0 Å, about 3.1 Å, about 3.2 Å, about 3.3 Å, about 3.4 Å, about 3.5 Å, about 3.6 Å, about 3.7 Å, about 3.8 Å, about 3.9 Å, about 4.0 Å, about 4.1 Å, about 4.2 Å, about 4.3 Å, about 4.4 Å, about 4.5 Å, about 4.6 Å, about 4.7 Å, about 4.8 Å, about 4.9 Å, about 5.0 Å, about 6.1 Å, about 6.2 Å, about 6.3 Å, about 6.4 Å, about 6.5 Å, about 6.6 Å, about 6.7 Å, about 6.8 Å, about 6.9 Å, about 7.0 Å, about 7.1 Å, about 7.2 Å, about 7.3 Å, about 7.4 Å, about 7.5 Å, about 7.6 Å, about 7.7 Å, about 7.8 Å, about 7.9 Å, about 8.0 Å, about 8.1 Å, about 8.2 Å, about 8.3 Å, about 8.4 Å, about 8.5 Å, about 8.6 Å, about 8.7 Å, about 8.8 Å, about 8.9 Å, about 9.0 Å, about 9.1 Å, about 9.2 Å, about 9.3 Å, about 9.4 Å, about 9.5 Å, about 9.6 Å, about 9.7 Å, about 9.8 Å, about 9.9 Å, about 10.0 Å, or any combination of the foregoing values, including any range comprising the foregoing values.

In some aspects, the zeolite used in the disclosed processes has a $SiO_2/Al_2O_3$ molar ratio of less than or equal to about 10, for example, about 1 to about 9.9, about 1 to about 6, or about 1 to about 3. In a further aspect, the zeolite has a $SiO_2/Al_2O_3$ molar ratio of about 2 to about 10. In a still further aspect, the zeolite used in the disclosed processes has a $SiO_2/Al_2O_3$ molar ratio of about 2 to about 5. In a yet further aspect, the zeolite used in the disclosed processes has a $SiO_2/Al_2O_3$ molar ratio of about 5 to about 10. In a yet further aspect, the zeolite used in the disclosed processes has a $SiO_2/Al_2O_3$ molar ratio of about 2.0, about 2.1, about 2.2, about 2.3, about 2.4, about 2.5, about 2.6, about 2.7, about 2.8, about 2.9, about 3.0, about 3.1, about 3.2, about 3.3, about 3.4, about 3.5, about 3.6, about 3.7, about 3.8, about 3.9, about 4.0, about 4.1, about 4.2, about 4.3, about 4.4, about 4.5, about 4.6, about 4.7, about 4.8, about 4.9, about 5.0, about 5.1, about 5.2, about 5.3, about 5.4, about 5.5, about 5.6, about 5.7, about 5.8, about 5.9, about 6.0, about 6.1, about 6.2, about 6.3, about 6.4, about 6.5, about 6.6, about 6.7, about 6.8, about 6.9, about 7.0, about 7.1, about 7.2, about 7.3, about 7.4, about 7.5, about 7.6, about 7.7, about 7.8, about 7.9, about 8.0, about 8.1, about 8.2, about 8.3, about 8.4, about 8.5, about 8.6, about 8.7, about 8.8, about 8.9, about 9.0, about 9.1, about 9.2, about 9.3, about 9.4, about 9.5, about 9.6, about 9.7, about 9.8, about 9.9, about 10.0, or any combination of the foregoing values, including any range comprising the foregoing values.

In some aspects, the zeolite used in the disclosed processes is a chabazite having a $SiO_2/Al_2O_3$ molar ratio of less than or equal to about 10, for example, about 1 to about 9.9, about 1 to about 6, or about 1 to about 3. In a further aspect, the chabazite has a $SiO_2/Al_2O_3$ molar ratio of about 2 to about 10. In a still further aspect, the chabazite used in the disclosed processes has a $SiO_2/Al_2O_3$ molar ratio of about 2 to about 5. In a yet further aspect, the chabazite used in the disclosed processes has a $SiO_2/Al_2O_3$ molar ratio of about 5 to about 10. In a yet further aspect, the chabazite used in the disclosed processes has a $SiO_2/Al_2O_3$ molar ratio of about 2.0, about 2.1, about 2.2, about 2.3, about 2.4, about 2.5, about 2.6, about 2.7, about 2.8, about 2.9, about 3.0, about 3.1, about 3.2, about 3.3, about 3.4, about 3.5, about 3.6, about 3.7, about 3.8, about 3.9, about 4.0, about 4.1, about 4.2, about 4.3, about 4.4, about 4.5, about 4.6, about 4.7, about 4.8, about 4.9, about 5.0, about 5.1, about 5.2, about 5.3, about 5.4, about 5.5, about 5.6, about 5.7, about 5.8, about 5.9, about 6.0, about 6.1, about 6.2, about 6.3, about 6.4, about 6.5, about 6.6, about 6.7, about 6.8, about 6.9, about 7.0, about 7.1, about 7.2, about 7.3, about 7.4, about 7.5, about 7.6, about 7.7, about 7.8, about 7.9, about 8.0, about 8.1, about 8.2, about 8.3, about 8.4, about 8.5, about 8.6, about 8.7, about 8.8, about 8.9, about 9.0, about 9.1, about 9.2, about 9.3, about 9.4, about 9.5, about 9.6, about 9.7, about 9.8, about 9.9, about 10.0, or any combination of the foregoing values, including any range comprising the foregoing values.

In some aspects, the zeolite used in the disclosed processes is a clinoptilolite having a $SiO_2/Al_2O_3$ molar ratio of less than or equal to about 10, for example, about 1 to about 9.9, about 1 to about 6, or about 1 to about 3. In a further aspect, the clinoptilolite has a $SiO_2/Al_2O_3$ molar ratio of about 2 to about 10. In a still further aspect, the clinoptilolite used in the disclosed processes has a $SiO_2/Al_2O_3$ molar ratio of about 2 to about 5. In a yet further aspect, the clinoptilolite used in the disclosed processes has a $SiO_2/Al_2O_3$ molar ratio of about 5 to about 10. In a yet further aspect, the clinoptilolite used in the disclosed processes has a $SiO_2/Al_2O_3$ molar ratio of about 2.0, about 2.1, about 2.2, about 2.3, about 2.4, about 2.5, about 2.6, about 2.7, about 2.8, about 2.9, about 3.0, about 3.1, about 3.2, about 3.3, about 3.4, about 3.5, about 3.6, about 3.7, about 3.8, about 3.9, about 4.0, about 4.1, about 4.2, about 4.3, about 4.4, about 4.5, about 4.6, about 4.7, about 4.8, about 4.9, about 5.0, about 5.1, about 5.2, about 5.3, about 5.4, about 5.5, about 5.6, about 5.7, about 5.8, about 5.9, about 6.0, about 6.1, about 6.2, about 6.3, about 6.4, about 6.5, about 6.6, about 6.7, about 6.8, about 6.9, about 7.0, about 7.1, about 7.2, about 7.3, about 7.4, about 7.5, about 7.6, about 7.7, about 7.8, about 7.9, about 8.0, about 8.1, about 8.2, about 8.3, about 8.4, about 8.5, about 8.6, about 8.7, about 8.8, about 8.9, about 9.0, about 9.1, about 9.2, about 9.3, about 9.4, about 9.5, about 9.6, about 9.7, about 9.8, about 9.9, about 10.0, or any combination of the foregoing values, including any range comprising the foregoing values.

In some aspects, the zeolite used in the disclosed processes has an ion exchange capacity of from about 0.5 meq/g to about 5 meq/g. In a further aspect, the zeolite has an ion exchange capacity of about 0.5 meq/g, about 0.6 meq/g, about 0.7 meq/g, about 0.8 meq/g, about 0.9 meq/g, about 1.0 meq/g, about 1.1 meq/g, about 1.2 meq/g, about 1.3 meq/g, about 1.4 meq/g, about 1.5 meq/g, about 1.6 meq/g, about 1.7 meq/g, about 1.8 meq/g, about 1.9 meq/g, about 2.0 meq/g, about 2.1 meq/g, about 2.2 meq/g, about 2.3 meq/g, about 2.4 meq/g, about 2.5 meq/g, about 2.6 meq/g, about 2.7 meq/g, about 2.8 meq/g, about 2.9 meq/g, about 3.0 meq/g, about 3.1 meq/g, about 3.2 meq/g, about 3.3 meq/g, about 3.4 meq/g, about 3.5 meq/g, about 3.6 meq/g, about 3.7 meq/g, about 3.8 meq/g, about 3.9 meq/g, about 4.0 meq/g, about 4.1 meq/g, about 4.2 meq/g, about 4.3 meq/g, about 4.4 meq/g, about 4.5 meq/g, about 4.6 meq/g, about 4.7 meq/g, about 4.8 meq/g, about 4.9 meq/g, about 5.0 meq/g, or any combination of the foregoing values, including any range comprising the foregoing values.

In some aspects, the zeolite can be mesoporous zeolite. The alkali metal or alkaline earth metal ion contained in the zeolite can include lithium (Li) ion, sodium (Na) ion, potassium (K) ion, magnesium (Mg) ion, calcium (Ca) ion, barium (Ba) ion, or combination thereof.

In some aspects, the chabazite can be mesoporous chabazite. The alkali metal or alkaline earth metal ion contained in the chabazite can include lithium (Li) ion, sodium (Na) ion, potassium (K) ion, magnesium (Mg) ion, calcium (Ca) ion, barium (Ba) ion, or combination thereof.

In some aspects, the clinoptilolite can be mesoporous clinoptilolite. The alkali metal or alkaline earth metal ion contained in the clinoptilolite can include lithium (Li) ion, sodium (Na) ion, potassium (K) ion, magnesium (Mg) ion, calcium (Ca) ion, barium (Ba) ion, or combination thereof.

In various aspects, the chabazite can be a zeolite that is prepared by treating a zeolite having a structure other than the chabazite structure with a strong base to be transformed into a zeolite having a chabazite structure. Examples of the zeolite having a structure other than the chabazite structure include, but are not limited to, a zeolite having a faujasite structure such as zeolite X or zeolite Y, mordenite, and zeolite A.

REFERENCES

Certain references are referred in the present disclosure by specifying the authors and publication year. These references correspond to the full citations provided herein below.

APHA, AVWVA, WEF. 2012. *Standard methods for the examination of water and wastewater.* 22nd edition. American Public Health Association, Washington, D.C.

Aponte-Morales, V. E. 2015. Ammonium Removal from High Strength Wastewater Using a Hybrid Ion Exchange Biological Process. PhD Dissertations, University of South Florida, USA.

Aponte-Morales, V. E., Tong, S., Ergas, S. J. 2016. Nitrogen removal from anaerobically digested swine waste centrate using a laboratory-scale chabazite-sequencing batch reactor. *Environmental Engineering Science,* 33(5), 324-332.

Auerbach, S. M., Carrado, K. A., & Dutta, P. K. (2003). *Handbook of zeolite science and technology.* CRC press.

Barber, J., & Shieh, Y. J. (1973). Sodium transport in Na+-rich *Chlorella* cells. Planta, 111(1), 13-22.

Cantrell, K. B., Ducey, T., Ro, K. S., Hunt, P. G. 2008. Livestock waste-to-bioenergy generation opportunities. Bioresource Technology, 99(17), 7941-7953.

Ciudad, G., Rubilar, O., Muñoz, P., Ruiz, G., Chamy, R., Vergara, C., Jeison, D. 2005. Partial nitrification of high ammonia concentration wastewater as a part of a shortcut biological nitrogen removal process. Process Biochemistry, 40(5), 1715-1719.

Crofts, A. R. (1966). Uptake of ammonium ion by chloroplasts, and its relation to photophosphorylation. *Biochemical and biophysical research communications,* 24(5), 725-731.

Fux, C., Velten, S., Carozzi, V., Solley, D., Keller, J. 2006. Efficient and stable nitritation and denitritation of ammonium-rich sludge dewatering liquor using an SBR with continuous loading. *Water Research,* 40(14), 2765-2775.

Halfhide, T., Dalrymple, O. K., Wilkie, A. C., Trimmer, J., Gillie, B., Udom, I., & Ergas, S. J. (2015). Growth of an indigenous algal consortium on anaerobically digested municipal sludge centrate: photobioreactor performance and modeling. *BioEnergy Research,* 8(1), 249-258.

Kjeldsen, P., Barlaz, M. A., Rooker, A. P., Baun, A., Ledin, A., Christensen, T. H. 2002. Present and Long-Term Composition of MSW Landfill Leachate: A Review. *Critical Reviews in Environmental Science and Technology,* 32(4), 297-336.

Kumar, M., Lin, J. G. 2010. Co-existence of anammox and denitrification for simultaneous nitrogen and carbon removal—Strategies and issues. *Journal of Hazardous Materials,* 178(1-3), 1-9.

Lee, E., & Zhang, Q. (2016). integrated co-limitation kinetic model for microalgae growth in anaerobically digested municipal sludge centrate. *Algal Research,* 18, 15-24.

Li, Y., Chen, Y.-F., Chen, P., Min, M., Zhou, W., Martinez, B., Zhu, J., Ruan, R. 2011. Characterization of a microalga *Chlorella* sp. well adapted to highly concentrated municipal wastewater for nutrient removal and biodiesel production. *Bioresource technology,* 102(8), 5138-5144.

Lito, P. F., Cardoso, S. P., Loureiro, J. M., & Silva, C. M. (2012). Ion exchange equilibria and kinetics. In *Ion Exchange Technology I* (pp. 51-120). Springer Netherlands.

Malovanyy, A., Sakalova, H., Yatchyshyn, Y., Plaza, E., Malovanyy, M. 2013. Concentration of ammonium from municipal wastewater using ion exchange process. *Desalination,* 329(0), 93-102.

Martins, T. H., Souza, T. S. O., Foresti, E. 2017. Ammonium removal from landfill leachate by Clinoptilolite adsorption followed by bioregeneration. *Journal of Environmental Chemical Engineering,* 5(1), 63-68.

Park, J., Jin, H.-F., Lim, B.-R., Park, K.-Y., Lee, K. 2010. Ammonia removal from anaerobic digestion effluent of livestock waste using green alga *Scenedesmus* sp. *Bioresource Technology,* 101(22), 8649-8657.

Rožić, M., Cerjan-Stefanović, Š., Kurajica, S., Vančina, V., Hodžić, E. 2000. Ammoniacal nitrogen removal from water by treatment with clays and zeolites. *Water Research,* 34(14), 3675-3681.

Ruiz, G., Jeison, D., Rubilar, O., Ciudad, G., Chamy, R. 2006. Nitrification-denitrification via nitrite accumulation for nitrogen removal from wastewaters. *Bioresource Technology,* 97(2), 330-335.

Rusten, B., Sahu, A. K. 2011. Microalgae growth for nutrient recovery from sludge liquor and production of renewable bioenergy. *Water Science and Technology,* 64(6), 1195-1201.

Schaedle, M., & Jacobson, L. (1965). Ion absorption and retention by *Chlorella pyrenoidosa.* I. Absorption of potassium. Plant physiology, 40(2), 214.

Schaedle, M., & Jacobson, L. (1967). Ion absorption and retention by *Chlorella pyrenoidosa.* III. Selective accumulation of rubidium, potassium and sodium. Plant physiology, 42(7), 953-958.

Tada, C., Yang, Y., Hanaoka, T., Sonoda, A., Ooi, K., Sawayama, S. 2005. Effect of natural zeolite on methane production for anaerobic digestion of ammonium rich organic sludge. *Bioresource Technology,* 96(4), 459-464.

Udert, K. M., Fux, C., Munster, M., Larsen, T. A., Siegrist, H., Gujer, W. 2003. Nitrification and autotrophic denitrification of source-separated urine. *Water Science and Technology,* 48(1), 119-130.

Wang, M., Park, C. 2015. Investigation of anaerobic digestion of *Chlorella* sp. and Micractinium sp. grown in high-nitrogen wastewater and their co-digestion with waste activated sludge. *Biomass and Bioenergy,* 80, 30-37.

Wang, M., Yang, H., Ergas, S. J., van der Steen, P. 2015. A novel shortcut nitrogen removal process using an algalbacterial consortium in a photo-sequencing batch reactor (PSBR). *Water Research,* 87, 38-48.

Wang, S., Peng, Y. 2010. Natural zeolites as effective adsorbents in water and wastewater treatment. *Chemical Engineering Journal*, 156(1), 11-24.

Wett, B., Alex, J. 2003. Impacts of separate rejection water treatment on the overall plant performance. *Water Science and Technology*, 48(4), 139-146.

Yuan, X., Wang, M., Park, C., Sahu, A. K., & Ergas, S. J. (2012). Microalgae growth using high-strength wastewater followed by anaerobic co-digestion. *Water Environment Research*, 84(5), 396-404.

Aspects

The following listing of exemplary aspects supports and is supported by the disclosure provided herein.

Aspect 1. A process for wastewater treatment, the process comprising: contacting a wastewater stream with a high capacity cation exchange media; and contacting the wastewater stream in contact with the high capacity cation exchange media with an algae inoculum; thereby providing treatment of the wastewater stream.

Aspect 2. The process of Aspect 1, wherein the process is carried out in a bioreactor.

Aspect 3. The process of Aspect 2, wherein the bioreactor is a continuous flow bioreactor.

Aspect 4. The process of Aspect 2, wherein the bioreactor is a batch bioreactor.

Aspect 5. The process of any one of Aspect 2-Aspect 4, wherein the bioreactor is a photobioreactor.

Aspect 6. The process of 5, wherein the photobioreactor comprises one or more light sources.

Aspect 7. The process of Aspect 6, wherein the light source is a constant light source.

Aspect 8. The process of Aspect 6, wherein the light source is configured to provide at least one light/dark cycle.

Aspect 9. The process of Aspect 6, wherein the light source emits at one or more wavelengths in the visible light spectrum.

Aspect 10. The process of Aspect 6, wherein the light source emits at an illumination density of about 50 µmol/m$^2$/sec to about 1000 µmol/m$^2$/sec.

Aspect 11. The process of Aspect 6, wherein the light source emits at an illumination density of about 50 µmol/m$^2$/sec to about 250 µmol/m$^2$/sec.

Aspect 12. The process of 5, wherein the photobioreactor comprises exposure to natural sun light.

Aspect 13. The process of any one of Aspect 1-Aspect 12, wherein the wastewater is in contact with the high capacity cation exchange media for a period of time prior to the contacting with the algae inoculum.

Aspect 14. The process of Aspect 13, wherein the period of time is about 24 hours to about 72 hours.

Aspect 15. The process of any one of Aspect 13-Aspect 14, wherein the contacting a wastewater stream with a high capacity cation exchange media is carried out at about 15° C. to about 30° C.

Aspect 16. The process of any one of Aspect 13-Aspect 15, wherein the contacting a wastewater stream with a high capacity cation exchange media is carried out with stirring.

Aspect 17. The process of Aspect 16, wherein stirring comprises mechanical agitation of the wastewater stream in contact with the high capacity cation exchange media.

Aspect 18. The process of Aspect 16, wherein stirring comprises aeration of the wastewater stream in contact with the high capacity cation exchange media.

Aspect 19. The process of any one of 1-Aspect 18, wherein the algae inoculum in the wastewater stream forms an algal culture.

Aspect 20. The process of Aspect 19, wherein the algal culture is at a stationary phase of growth.

Aspect 21. The process of Aspect 20, wherein algal cells are removed from the algal culture to provide a first component comprising the algal cells and a second component that comprises treated wastewater.

Aspect 22. The process of Aspect 21, wherein about 90% to about 99.9% of the algal cells are removed from the algal culture.

Aspect 23. The process of Aspect 4, wherein the algae inoculum is allowed to grow in the batch reactor for a period of about 1 day to about 10 days, thereby providing a first liquid suspension comprising an algal culture from a first growth cycle.

Aspect 24. The process of Aspect 23, wherein the algal culture is at a stationary phase of growth.

Aspect 25. The process of Aspect 23, further comprising harvesting of the algal culture, wherein harvesting comprises separation of the first liquid suspension comprising the algal culture into a first component comprising a liquid with a significantly reduced concentration of algal cells from the algal culture and a second component enriched in the algal cells of the algal culture.

Aspect 26. The process of Aspect 25, wherein the first component has about 90% to about 99.9% of the algal culture removed from the first liquid suspension comprising the algal culture.

Aspect 27. The process of Aspect 25, wherein the first component comprises a concentration of algae cells that is about 0.0001% to about 1% the concentration of algal cells found in the first liquid suspension comprising the algal culture.

Aspect 28. The process of any one of Aspect 25-Aspect 27, further comprising placing the first component in contact with the high capacity cation exchange media for about a period of about 1 day to about 10 days, thereby providing a second liquid suspension comprising an algal culture from a second growth cycle.

Aspect 29. The process of any one of Aspect 25-Aspect 28, further comprising a third growth cycle, a fourth growth cycle, or a fifth growth cycle.

Aspect 30. The process of any one of Aspect 1-Aspect 29, wherein the algae inoculum comprises at least one *Chlorella* sp.

Aspect 31. The process of Aspect 30, wherein the least one *Chlorella* sp. is an isolated *Chlorella* sp.

Aspect 32. The process of Aspect 31, wherein the least one isolated *Chlorella* sp. is a substantially pure culture.

Aspect 33. The process of any one of Aspect 30-Aspect 32, wherein the at least one *Chlorella* sp. is a consortium of two to five independently selected *Chlorella* sp.

Aspect 34. The process of any one of Aspect 30-Aspect 33, wherein the algae inoculum further comprises at least one species selected from *Acaryochloris* sp., *Amphora* sp., *Anabaena* sp., *Anacystis* sp., *Anikstrodesmis* sp., *Asteromonas* sp., *Azoarcus* sp., *Bacillus* sp., *Botryococcus* sp., *Chaetoceros* sp., *Chlorococcum* sp., *Closterium* sp., *Crocosphaera* sp., *Cyanotheca* sp., *Cyclotella* sp., *Cylindrotheca* sp., *Desmodesmus* sp., *Dunaliella* sp., *Escherichia* sp., *Euglena* sp., *Halobacterium* sp., *Halomonas* sp., *Halospirulina* sp., *Hematococcus* sp., *Isochrysis* sp., *Lyngbya* sp., *Marinichlorella* sp., *Micratinium* sp., *Microcystis* sp., *Monochrysis* sp., *Monoraphidium* sp., *Nannochloris* sp., *Nannochlorum* sp., *Nannochloropsis* sp., *Navicula* sp., *Nephrochloris* sp., *Nephroselmis* sp., *Nitrobacter* sp., *Nitrococcus* sp., *Nitrosococcus* sp., *Nitrosomonas* sp., *Nitrosopumilus* sp., *Nitrospina* sp., *Nitzschia* sp., *Nodularia* sp.,

*Nostoc* sp., *Oochromonas* sp., *Oocystis* sp., *Oscillatoria* sp., *Pavlova* sp., *Pediastrum* sp., *Phaeodactylum* sp., *Picochlorum* sp., *Platymonas* sp., *Pleurochrysis* sp., *Porphyra* sp., *Prochlorococcus* sp., *Pseudoanabaena* sp., *Pseudomonas* sp., *Pyramimonas* sp., *Rhodoceros* sp., *Rhodocyclus* sp., *Rhodomonas* sp., *Rubrivivax* sp., *Scenedesmus* sp., *Selenastrum* sp., *Spirulina, Stichococcus* sp., *Synechococcus* sp., *Synechocystis* sp., *Tetraselmis* sp., *Thalassiosira* sp., *Thermosynechocystis* sp., *Trichodesmium* sp., *Thiobacillus* sp., *Uronema* sp., and *Zoogloea* sp.

Aspect 35. The process of any one of Aspect 1-Aspect 34, wherein the high capacity cation exchange media preferentially binds or adsorbs ammonium ions.

Aspect 36. The process of Aspect 35, wherein the high capacity cation exchange media is a zeolite.

Aspect 37. The process of Aspect 36, wherein the zeolite is a chabazite, a clinoptilolite, and mixtures thereof.

Aspect 38. The process of Aspect 37, wherein the zeolite is at least one chabazite.

Aspect 39. The process of any one of Aspect 36-Aspect 38, wherein the zeolite has a particle size of about 100 μm to about 2500 μm.

Aspect 40. The process of any one of Aspect 36-Aspect 40, wherein the zeolite has an average pore diameter from about 1 Å to about 10 Å.

Aspect 41. The process of any one of Aspect 36-Aspect 40, wherein the zeolite has a $SiO_2/Al_2O_3$ molar ratio of less than or equal to about 10.

Aspect 42. The process of any one of Aspect 36-Aspect 41, wherein the zeolite is present in amount of about 30 g/L to about 300 g/L.

Aspect 43. The process of Aspect 42, wherein the zeolite is present in an amount of about 50 g/L to about 70 g/L.

Aspect 44. The process of Aspect 42, wherein the zeolite is present in an amount of about 130 g/L to about 170 g/L.

Aspect 45. The process of Aspect 42, wherein the zeolite is present in an amount of about 230 g/L to about 270 g/L.

Aspect 46. The process of any one of Aspect 1-Aspect 45, further comprising removal of an algal biomass.

Aspect 47. The process of Aspect 46, wherein the algal biomass comprises an algal culture comprising essentially only algae species of the algae inoculum.

Aspect 48. The process of any one of Aspect 46-Aspect 47, wherein the algal biomass is enriched in one or more protein.

Aspect 49. The process of any one of Aspect 46-Aspect 47, wherein the algal biomass is enriched in one or more carbohydrate.

Aspect 50. The process of any one of Aspect 46-Aspect 47, wherein the algal biomass is enriched in one or more lipid.

Aspect 51. The process of Aspect 50, wherein the lipid comprises one or more volatile fatty acid.

Aspect 52. The process of any one of Aspect 48-Aspect 51, wherein enriched is an increased concentration of a protein, a carbohydrate, or a lipid compared to an algal biomass produced under the same conditions in the absence of the high capacity cation exchange media.

Aspect 53. The process of any one of Aspect 48-Aspect 52, wherein a protein, a carbohydrate, or a lipid is selectively enriched by modulating the dosage of the high capacity cation exchange media used in the process.

Aspect 54. The process of any one of Aspect 1-Aspect 53, wherein the wastewater stream is an industrial wastewater, a landfill leachate, a source separated urine, a centrate from an anaerobic digestion process, or combinations thereof.

Aspect 55. The process of Aspect 54, wherein $NH_4^+$—N concentration in the wastewater stream is about 100 mg/L to about 2000 mg/L.

Aspect 56. The process of Aspect 54, wherein $NH_4^+$—N concentration in the wastewater stream is at least about 200 mg/L.

Aspect 57. The process of Aspect 54, wherein $NH_4^+$—N concentration in the wastewater stream is at least about 1000 mg/L.

Aspect 58. A process for production of a biofuel, a biofertilizer, or an animal feed comprising the step: (a) extracting one or more protein, one or more lipid, one or more carbohydrate, or combinations thereof, from an algal biomass provided by the process of any one of Aspect 1-Aspect 57; and/or (b) mixing the algal biomass provided by the process of any one of Aspect 1-Aspect 57 with one or more agriculturally acceptable excipient, preservative, or carrier.

Aspect 59. A system for wastewater treatment, the system comprising: a first inlet for receiving a wastewater stream; a bioreactor configured to receive the wastewater stream from the first inlet; one or more light sources configured to emit light within the bioreactor; and a first outlet for removing liquid from the bioreactor.

From the foregoing, it will be seen that aspects herein are well adapted to attain all the ends and objects hereinabove set forth together with other advantages which are obvious and which are inherent to the structure.

While specific elements and steps are discussed in connection to one another, it is understood that any element and/or steps provided herein is contemplated as being combinable with any other elements and/or steps regardless of explicit provision of the same while still being within the scope provided herein.

It will be understood that certain features and sub-combinations are of utility and may be employed without reference to other features and sub-combinations. This is contemplated by and is within the scope of the claims.

Since many possible aspects may be made without departing from the scope thereof, it is to be understood that all matter herein set forth or shown in the accompanying drawings and detailed description is to be interpreted as illustrative and not in a limiting sense.

It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

EXAMPLES

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

Characteristics of anaerobic digester centrate. Centrate used in the example studies was obtained from a pilot anaerobic digester treating waste activated sludge (WAS) from a local enhanced phosphorus removal treatment facility. The anaerobic digester had a working volume of 18 L and was operated at 45° C. and a solids residence time of 21 days for over 100 days. Effluent from the digester was centrifuged at 4000 rpm for 15 mins. The supernatant from this initial solid-liquid separation step was further filtrated through 1.5 μm filter paper (934-AH, Whatman). The filtrate was collected as centrate for studies described herein. The characteristics of the centrate are summarized in Table 1.

TABLE 1

Characteristics of centrate from anaerobic digestion of sewage sludge.

| Parameters | Unit | Value |
|---|---|---|
| $NH_4^+$—N | mg $L^{-1}$ | 1,180 |
| TP | mg $L^{-1}$ | 265 ± 4.2 |
| VFA | mg $L^{-1}$ | 822 ± 4.9 |
| COD | mg $L^{-1}$ | 2340 ± 0 |
| Alkalinity | mg $L^{-1}$ as $CaCO_3$ | 2,585 ± 304 |
| pH | — | 8.0 ± 0.1 |

Hybrid Ion-exchange and Algae Photosynthesis Reactor Setup. Wild-type algae *Chlorella* originally harvested from a local wastewater treatment plant were enriched in diluted sludge centrate for this study. Algae were settled for 24 hours, and the settled algae were collected as the inoculum for hybrid ion-exchange and algae photosynthesis reactors. The chlorophyll a and dry weight of algal inoculum was 81.1±2.5 mg $L^{-1}$ and 5412±159 mg $L^{-1}$, respectively. The algal inoculum was washed with DI water for three times to remove residuals from the diluted sludge centrate before seeding the hybrid ion-exchange and algae photosynthesis reactors.

Bowie Chabazite (a type of zeolite, product code: AZLB-Ca) from St. Cloud, N. Mex. was sieved to obtained particle size between 1.0-1.4 mm. Chabazite was washed with DI to remove the dust residual and dried at 100° C. for the study. Zeolite dosages evaluated were 60 (IA-60), 150 (IA-150) and 250 (IA-250) g/L, based on isotherm and kinetics studies. 500 mL of centrate was added in 1 L Erlenmeyer flasks with desired amount of zeolite. Reactors were set up in the 21±2° C. constant temperature room in duplicate. A shaking table set at 100±10 rpm provided mixing for the reactors. After 24 hours when the ion exchange reaction reached equilibrium, 40 mL of pre-washed algae inoculum were added into each reactor, which was recorded as time zero. The reactors were continuously illuminated at 121±6 μmoles $m^{-2} s^{-1}$ continuously. Zeolite was always resident at the bottom of reactors due to their high density.

In some studies, the reactors were continuously operated until a constant $NH_4^+$—N concentration was observed. Algae was harvested when the total suspended solids (TSS) concentration of the algal biomass reached stationary state. Reactors with solely zeolite or algal biomass were also set up as controls.

Figure 5:
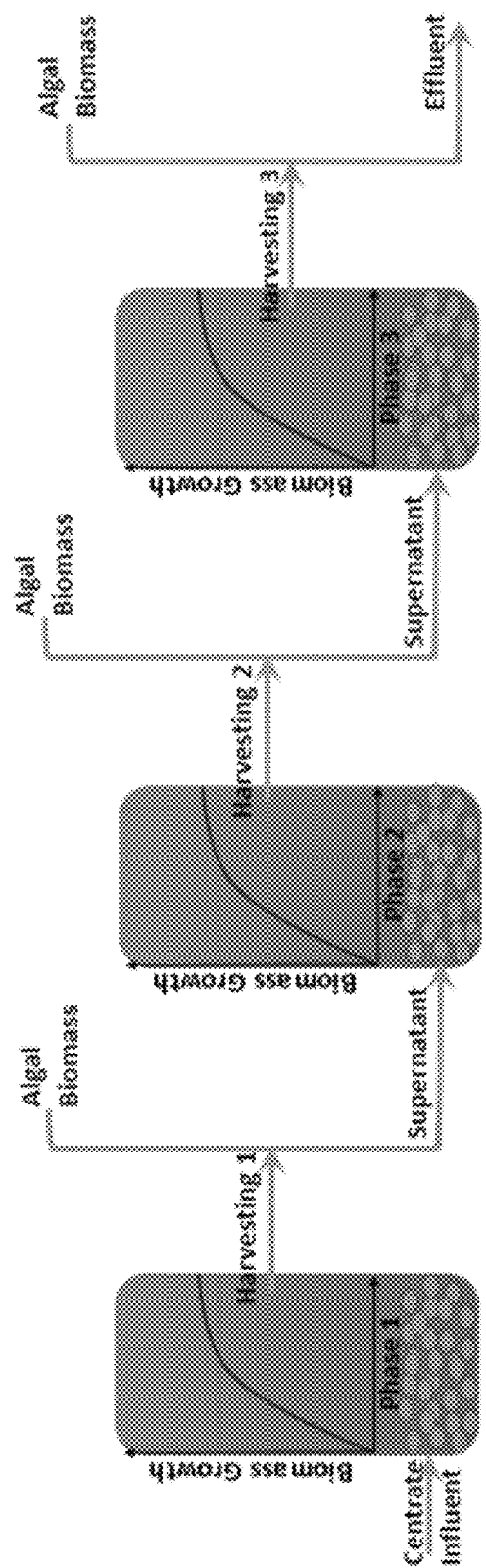
FIG. 5 is an exemplary schematic diagram of a disclosed operational strategy for the disclosed hybrid ion-exchange and algae photosynthesis process reactor systems. In the figure, the hybrid ion-exchange and algae photosynthesis process reactor system was operated for three phases. Algae were harvested by centrifugation when the algal biomass concentrations reached stationary state. The supernatant was replaced into original reactors for the continuous growth of algae. As shown in this example, recycling of supernatant were repeated twice.

In other studies, the reactors were operated for three phases (FIG. 5). Algae were harvested by centrifugation at 3,800 rpm for 10 mins when the algal biomass concentrations reached stationary state. The supernatant was replaced into original reactors for the continuous growth of algae. Recycling of supernatant were repeated twice. Reactors with only algal biomass or solely zeolite were also set up as controls.

Analytical Methods. Biomass dry weight (total suspended solids [TSS]) and alkalinity were measured according to Standard Methods (APHA et al., 2012). COD was measured according to Standard Methods (5200B) using Orbeco-Hellige mid-range (0-1500 mg/L) COD kits. Total P was measured using Hach TNT plus 845 test kits. Total N was measured by Hach TNT plus 827 and TNT 828 test kits. Volatile fatty acid (VFA) concentrations were measured by the esterification method using Hach TNT plus 872 test kits. The results were reported as the equivalent concentration of acetic acid. Cation including $NH_4^+$, $Na^+$, $K^+$, $Ca^{2+}$, and $Mg^{2+}$ concentrations were measured using a Metrohm Peak 850 Professional AnCat ion chromatography (IC) system (Metrohm Inc., Switzerland).

The harvested algae were freeze-dried (Labconco, US) for starch, lipid, and protein analysis. The total starch content of the algal biomass were measured using Megazyme total starch (AA/AMG) kits (catalog #K-TSTA), following Association of Official Agricultural Chemists (AOAC) Method 996.11. Protein content was analyzed by the bicinchionic acid colorimetric method (BAC) using Micro BC Assay Kits (Interchim, France). The lipid contents were analysis by a commercial laboratory (Eurofins Scientific, US) according to the AOAC Method 996.06.

Figure 2A:
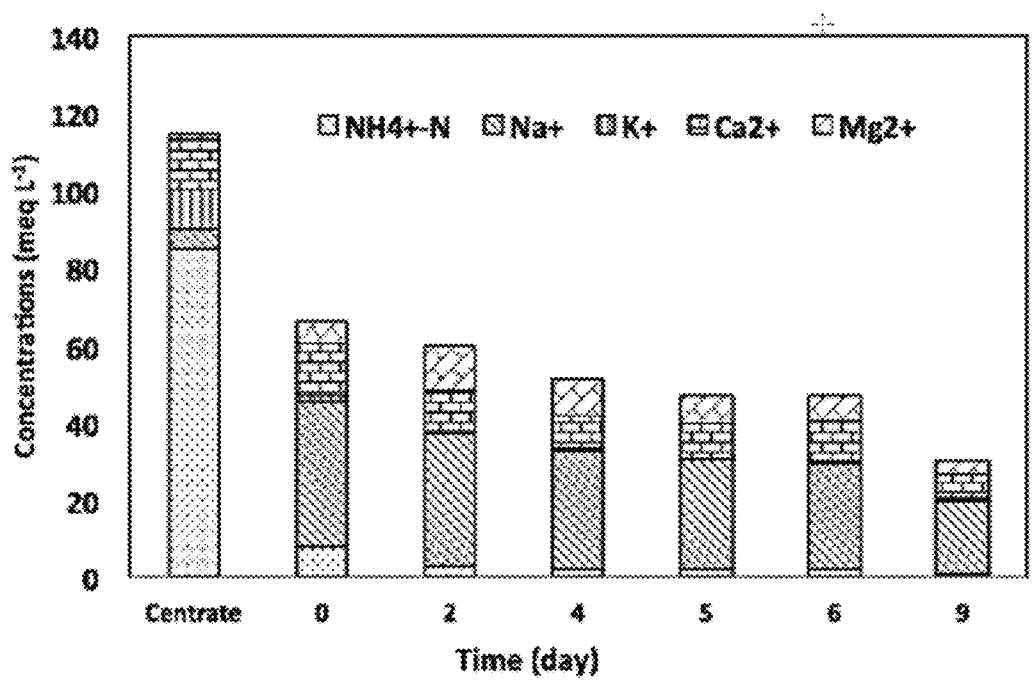
FIGS. 2A-2B show representative cation concentration data versus time.
Figure 2B:
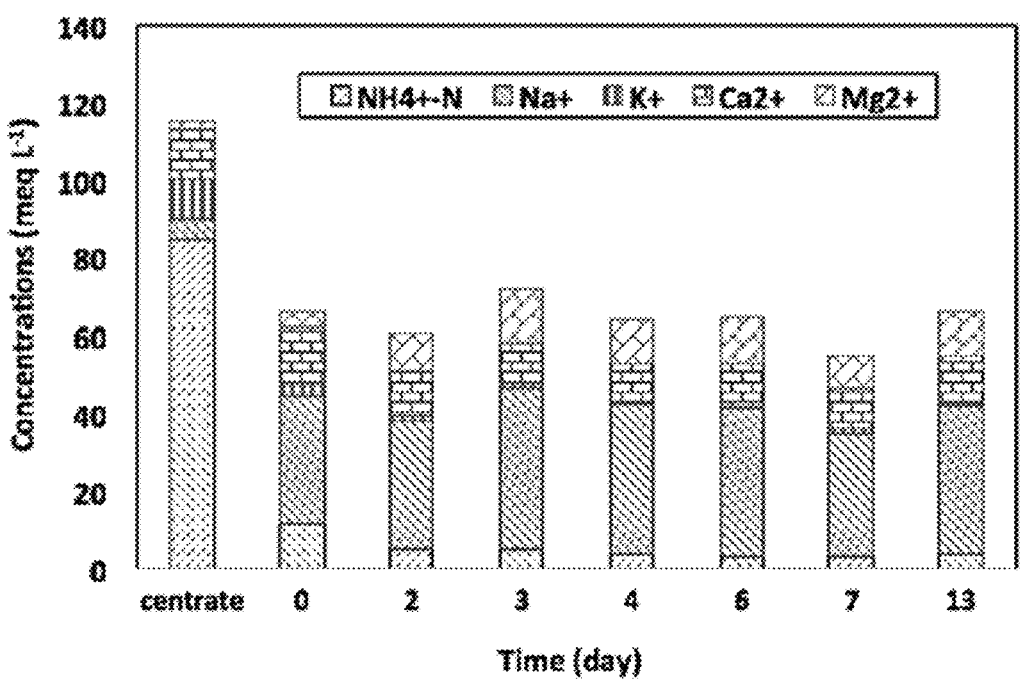

Hybrid Ion-exchange and Algae Photosynthesis Process Performance. Over 95% of ion exchange activity between $NH_4^+$ and $Na^+$ occurred within 24 hours after the addition of chabazite. The decrease in $NH_4^+$ concentrations eliminated the ammonia toxicity to the algae. $NH_4^+$—N concentration in the hybrid ion-exchange and algae photosynthesis reactor were reduced from 84 meq/L (1,180 mg/L) to 7.7 meq/L (107 mg/L) after adsorption for 24 hours. The addition of algae further reduced the $NH_4^+$—N concentration. The growth of algae after 9 days in the hybrid ion-exchange and algae photosynthesis reactor reduced the $NH_4^+$—N concentrations to 0.7 meq/L (10.5 mg/L. FIG. 2A). The $NH_4^+$—N adsorbed by the chabazite was released to the liquid phase when aqueous $NH_4^+$—N was taken up by the algae. The saturated chapazite can be regenerated along with algae growth. However, the reactor without algae (IX-Control) reached steady state and no further removal of $NH_4^+$—N was observed after 2 days. The $NH_4^+$—N concentration of the ion exchange-control was still as high as 50 mg/L, which was much higher than that of hybrid ion-exchange and algae photosynthesis reactor (10.5 mg/L).

Figure 3:
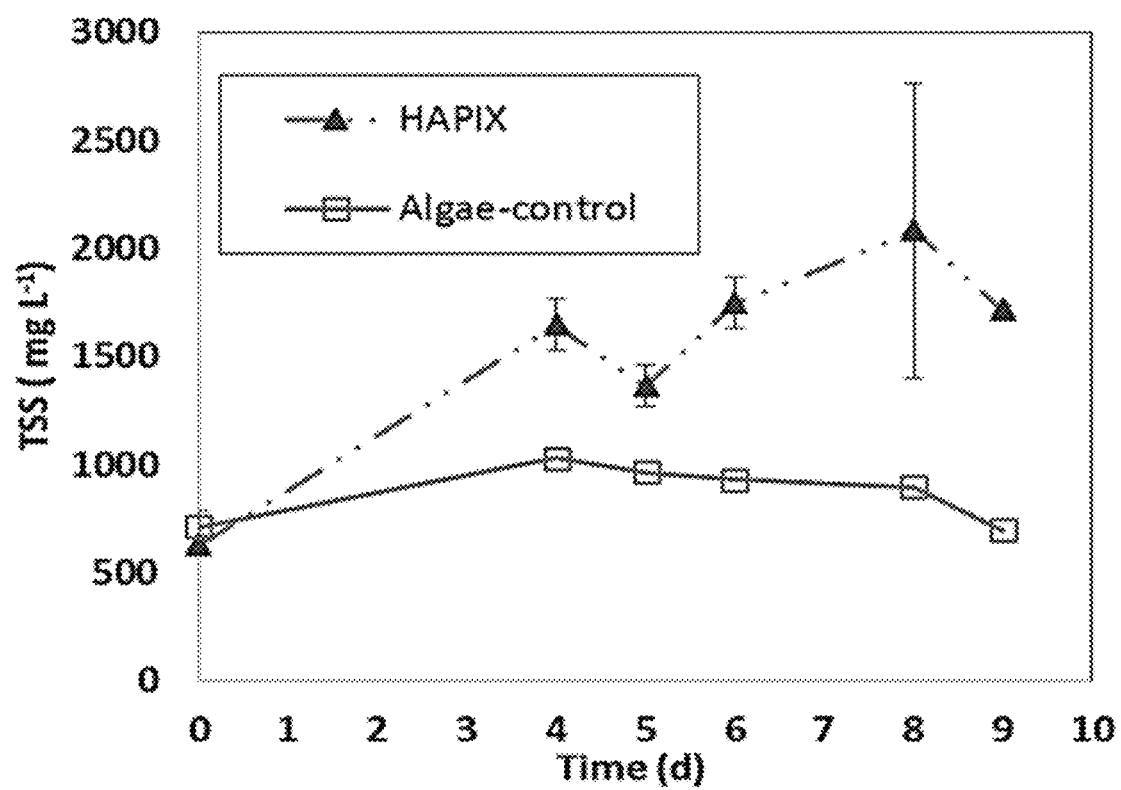
FIG. 3 shows representative data for dry weight of biomass in a representative disclosed hybrid ion-exchange and algae photosynthesis process reactor system with chabazite (indicated as "HAPIX" in the inset key; the reactor system was charged with 150 g/L chabazite) or a control reactor system without chabazite (indicated as "Algae-control" in the inset key).

FIG. 3 shows that the algae biomass in the hybrid ion-exchange and algae photosynthesis reactor (charged with 150 g/L chabazite; operated through a single growth phase) increased from 700 mg/L to over 2000 mg/L after 8 days. However, the control reactor without the addition of chabazite showed an inhibition of algae growth. The data suggest that the hybrid ion-exchange and algae photosynthesis process is feasible for the treatment of high strength wastewater and produce algae biomass that could be used for the production of proteins, animal feed or biofuels.

Figure 4A:
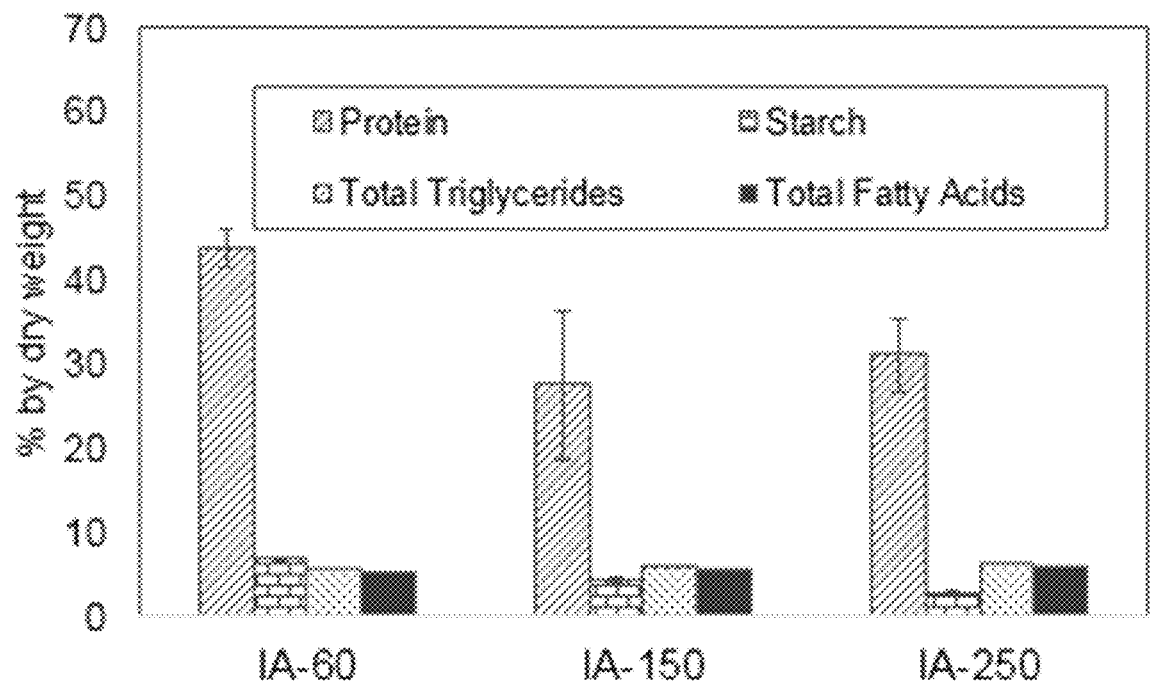
FIGS. 4A-4B show representative intracellular contents of algae determined in representative disclosed hybrid ion-exchange and algae photosynthesis process reactor systems. The amount of chabazite used to charge the representative disclosed hybrid ion-exchange and algae photosynthesis process reactor system is indicated in the figure as follows: "IA-60" indicates that the reactor system was charged with 60 g/L chabazite; "IA-150" indicates that the reactor system was charged with 150 g/L chabazite; and "IA-250" indicates that the reactor system was charged with 150 g/L chabazite.
Figure 4B:
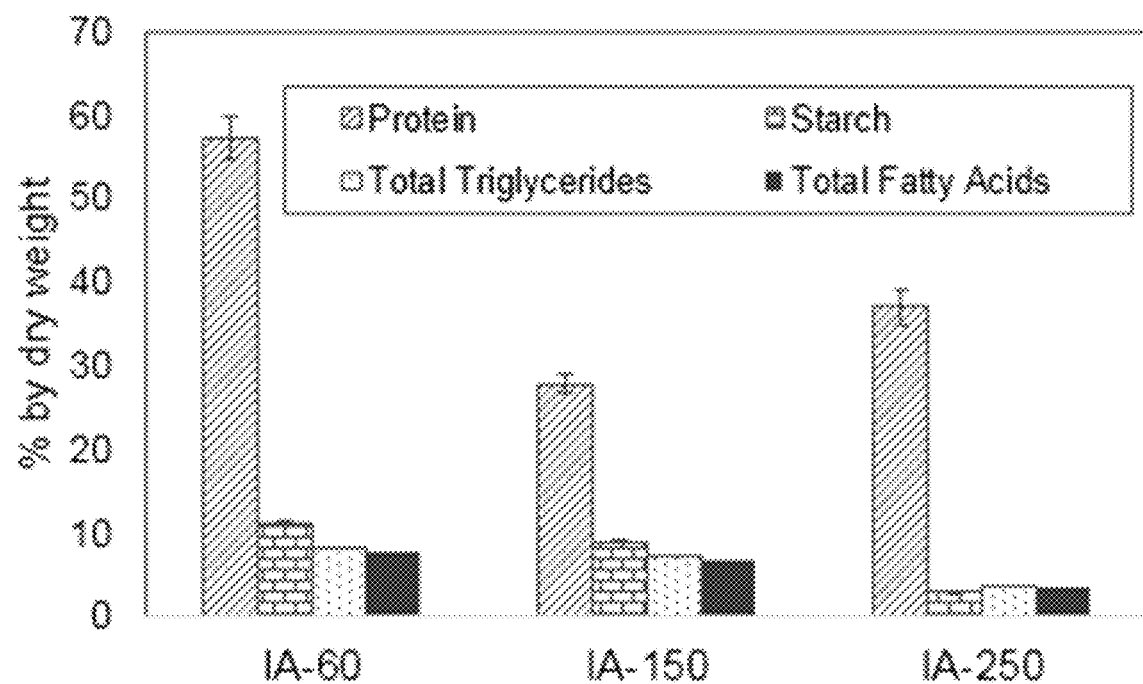

Intracellular starch, triglyceride, fatty acid and protein content of algae grown in the disclosed hybrid ion-exchange and algae photosynthesis reactors was determined using the methods described above and the data are shown in FIGS. 4A and 4B. The data show that the total lipid present as triacylglycerides (TGA) was low (<10% by dry weight) for all the dosages. However, algae harvested in Phase 3 had higher TGA content than Phase 1 at dosages of 60 g L−1

(IA-60) and 150 g L−1 (IA-150), due to the low aqueous $NH_4^+$ concentrations in the Phase 3. However, the TGA content of IA-250 in Phase 3 was lower than that of Phase 1 because of the high ash content of the biomass harvested in Phase 3.

It has been previously observed that algae grown in wastewater with high N content tend to have low lipid content. For example, *C. vulgaris* grown at 247 mg N L−1 had lipid content of 5.9% by dry weight (Converti, A., et al., Chemical Engineering and Processing: Process Intensification, 2009. 48(6): p. 1146-1151). *Chlorella* grown in wastewater with fatty acid methyl ester content of 9.98-11.04% by total VSS (Li, Y., et al., Bioresource technology, 2011. 102(8): p. 5138-5144). Algae accumulate lipids under N starvation conditions (Shifrin, N. S. and S. W. Chisholm, Journal of Phycology, 1981. 17(4): p. 374-384; Solovchenko, A. E., et al., Journal of Applied Phycology, 2008. 20(3): p. 245-251). Lipid accumulation under N limited condition is associated with intracellular fatty acid acyl-CoA and activate diacylglycerol acyltransferase, which convert fatty acid acyl-CoA to triglyceride (Sukenik, A. and A. Livne, Plant and cell physiology, 1991. 32(3): p. 371-378). High $NH_4^+$ strength centrate treated by a disclosed process did not induce lipid accumulation in the algal biomass. However, without wishing to be bound by a particular theory, it is possible that using the disclosed processes to treat low strength wastewater, such as primary and secondary effluent, may result in N deficient conditions that could result in accumulation of high lipid content in algae for biofuel production.

Figure 6:
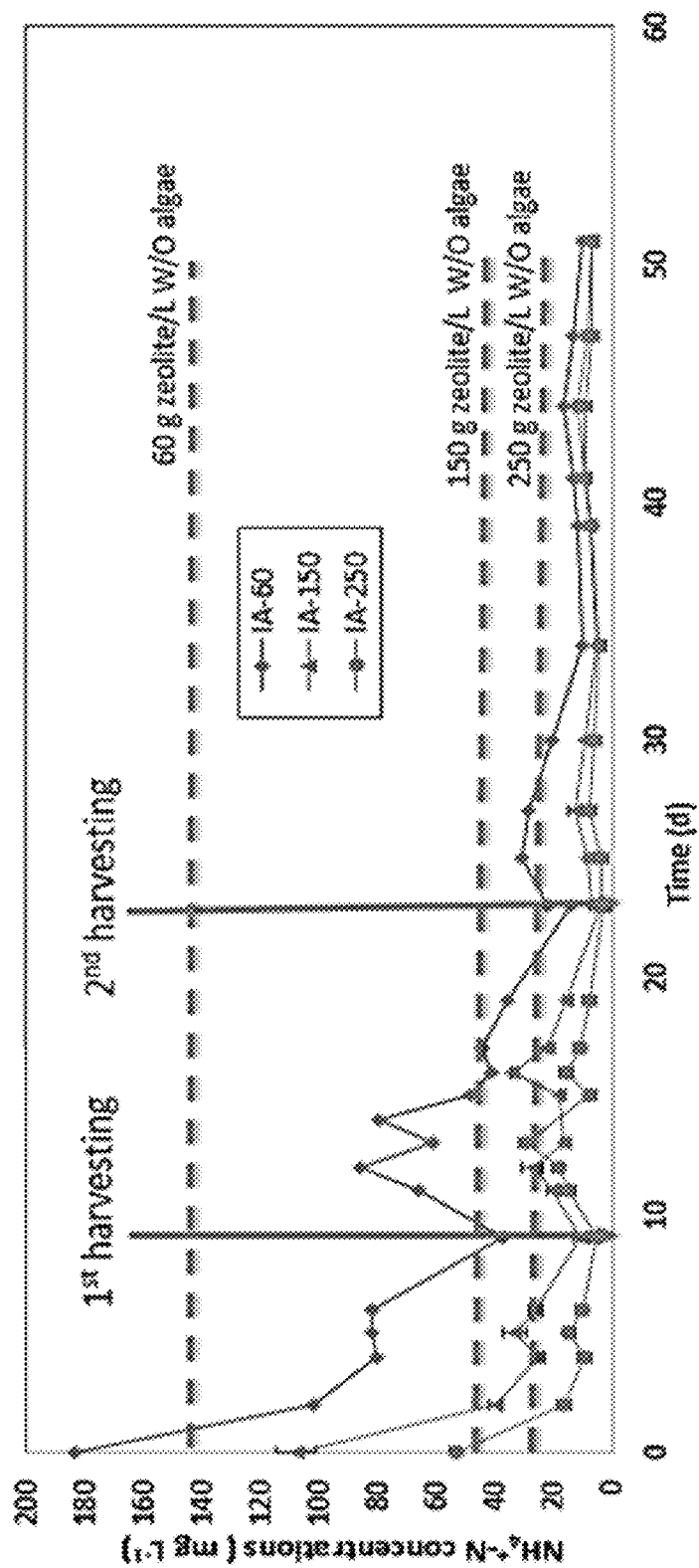
FIG. 6 shows representative $NH_4^+$—N concentration data versus time for a representative hybrid ion-exchange and algae photosynthesis process reactor systems. As described in FIG. 5, a representative hybrid ion-exchange and algae photosynthesis process reactor system was operated for three growth phases and the algal were harvested at the indicated times shown in the figure. The dashed horizontal lines show the $NH_4^+$—N concentration in control reactor systems comprising the indicated amounts of chabazite, but without any algae. The amount of chabazite used to charge the representative disclosed hybrid ion-exchange and algae photosynthesis process reactor system is indicated in the figure as follows: "IA-60" indicates that the reactor system was charged with 60 g/L chabazite; "IA-150" indicates that the reactor system was charged with 150 g/L chabazite; and "IA-250" indicates that the reactor system was charged with 150 g/L chabazite.
Figure 8:
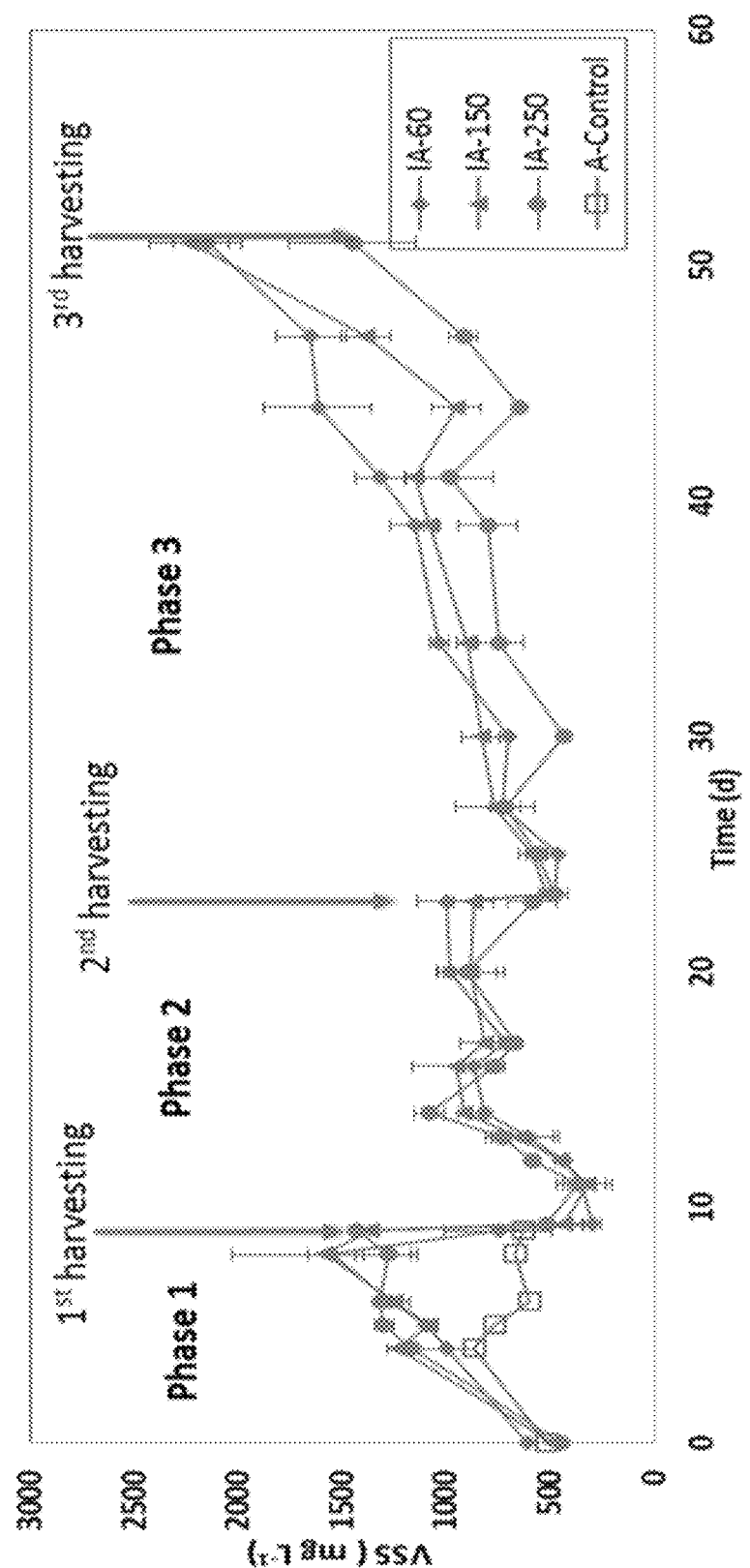
FIG. 8 shows representative data for biomass production versus time for representative hybrid ion-exchange and algae photosynthesis process reactor systems. Biomass production was based on measurement of total volatile solids ("VSS"). As described in FIG. 5, hybrid ion-exchange and algae photosynthesis process reactor system was operated for three growth phases and the algal were harvested at the indicated times shown in the figure. The amount of chabazite used to charge the representative disclosed hybrid ion-exchange and algae photosynthesis process reactor system is indicated in the figure as follows: "IA-60" indicates that the reactor system was charged with 60 g/L chabazite; "IA-150" indicates that the reactor system was charged with 150 g/L chabazite; and "IA-250" indicates that the reactor system was charged with 150 g/L chabazite. Data for a control reactor comprising algae without any chabazite are shown for the line indicated in the key inset as "A-control."

The data in Table 2 show the fatty acid profiles of harvested biomass. The data show that approximately 67-70% of fatty acids in the biomass harvested using a disclosed process were unsaturated, in which 43%-54% were polyunsaturated fatty acids (Table 2). The fatty acids are mainly composed of C16:0, C16:1, C18:0, C18:2 and C18:3, among which palmitic acid (C16:0), oleic acid (C18: 1), linoleic acid (C 18:2), and linolenic acid (C 18:3) were the dominant fatty acids. Similar results have been described showing that the dominant fatty acid produced by *Chlorella* were hexadecanoic acid (C 16:0), linoleic acid (C 18:2), and linolenic acid (C 18:3) (Wang, H., et al., Bioresource Technology, 2012. 104(Supplement C): p. 215-220).

phases of growth as described above are shown in FIGS. 6 and 89. FIG. 6 shows the results for $NH_4^+$—N removal for reactors charged at three different levels (60 g/L, 150 g/L, and 250 g/L) versus time, and compared to the level of $NH_4^+$—N removal for the same reactors that contained only chabazite without any algae present. The data show that $NH_4^+$—N removal was rapidly reduced to less than 10 mg/L, whereas in the zeolite only reactors there was limited $NH_4^+$—N removal. The data also show that $NH_4^+$—N removal was greater in the presence of higher chabazite charging concentrations. FIG. 8 shows that presence of chabazite greatly improved algal growth compared to a control reactor with only algae present and no chabazite. Without wishing to be bound by a particular theory, the enhanced algae growth in the disclosed hybrid ion-exchange and algae photosynthesis reactor was due to the lack of inhibition in the presence of much lower $NH_4^+$—N concentration compared to the reactor without chabazite.

Figure 7A:
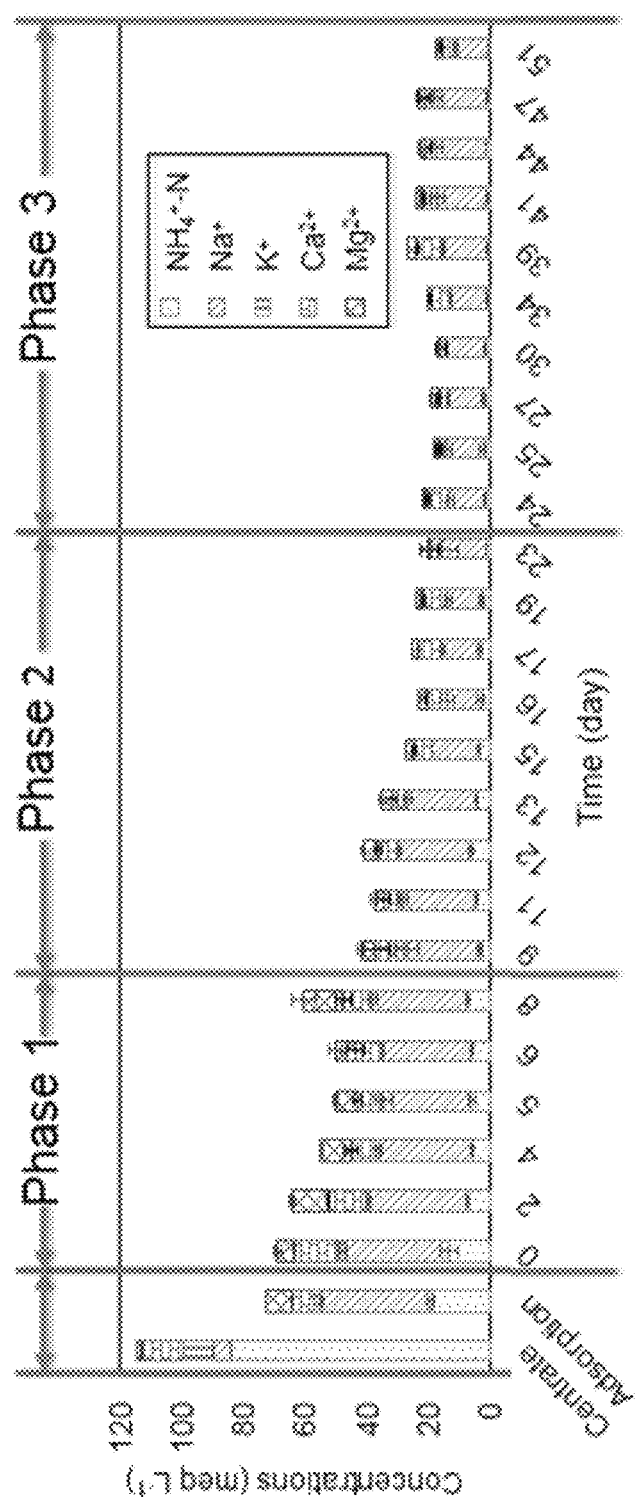
FIGS. 7A-7C show representative cation concentration data versus time for representative hybrid ion-exchange and algae photosynthesis process reactor systems. As described in FIG. 5, a representative hybrid hybrid ion-exchange and algae photosynthesis process reactor system was operated for three growth phases and the algal were harvested at the indicated times shown in the figure. With regard to the labels shown along the x-axis: "Centrate" indicates cation concentration for the untreated centrate; "Adsorption" indicates cation concentration obtained after adsorption for 24 hours; "Day 0" indicates cation concentration obtained at the time when algae were added; "Phase 1" indicates cation concentration obtained during initial algae growth phase; and "Phase 2" and "Phase 3" indicates cation concentration obtained during algae growth in recycled supernatant.
Figure 7B:
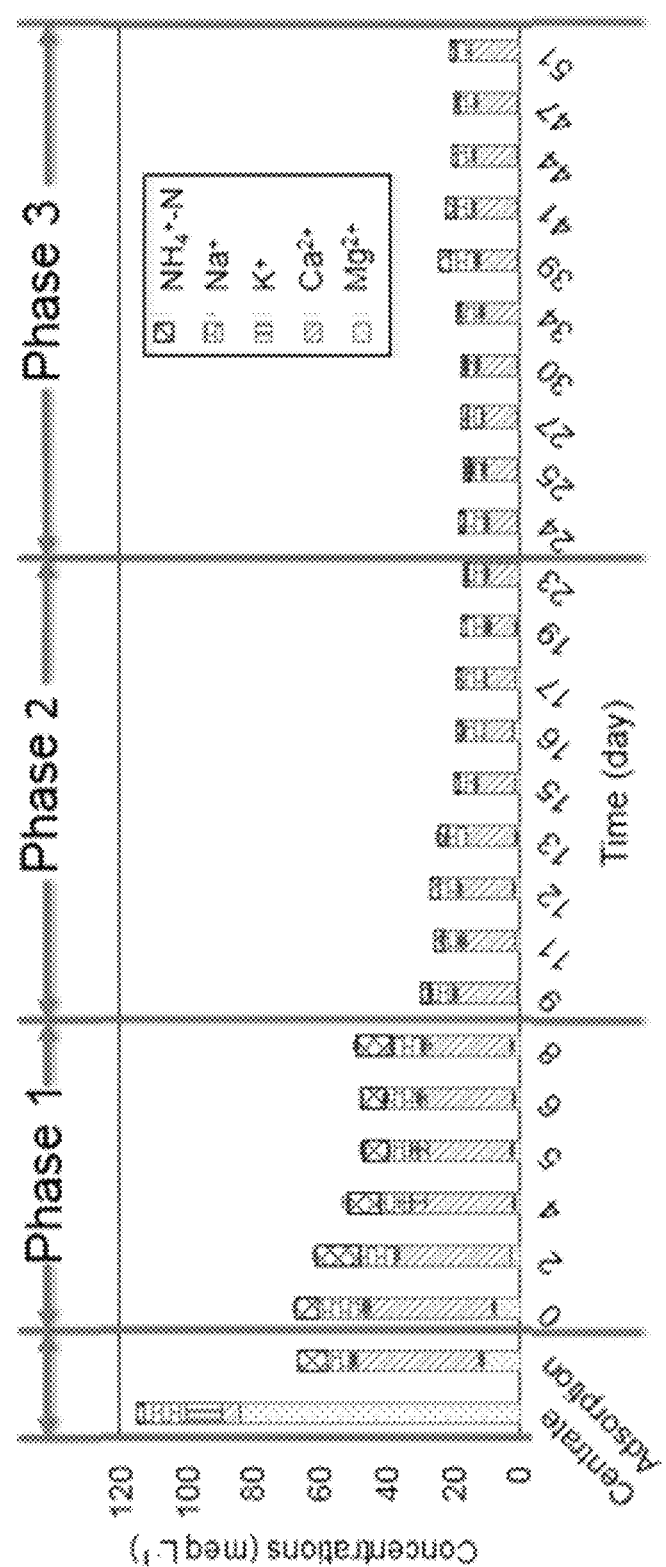
Figure 7C:
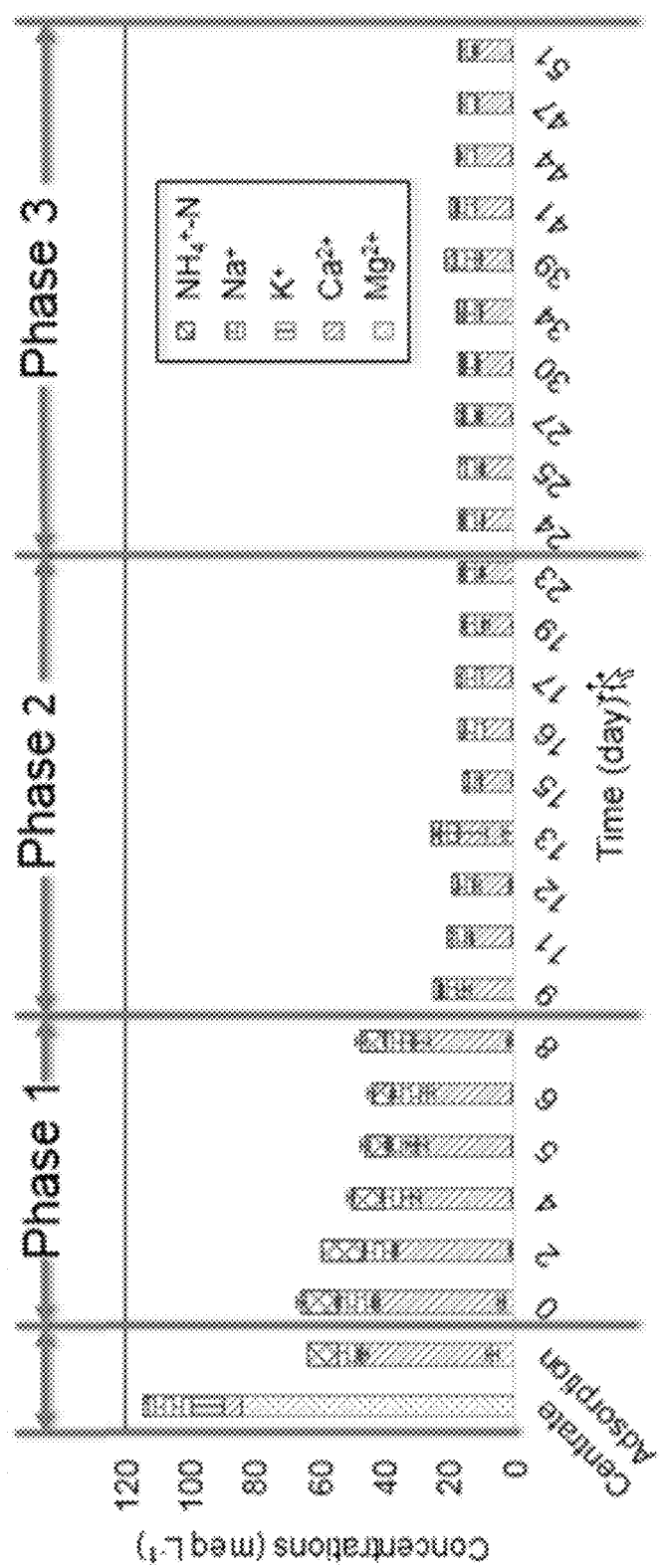

Additional data regarding the performance of disclosed hybrid ion-exchange and algae photosynthesis reactors are shown in FIGS. 7A-7C, respectively, for reactors charged with 60, 150, and 250 g/L chabazite. The data show that over 95% of ion exchange activity between $NH_4^+$ and $Na^+$ occurred within 24 hours after the addition of chabazite. The decrease in $NH_4^+$ concentrations appear to eliminate the ammonia toxicity to algae at all dosages of chabazite test. $NH_4^+$ concentrations were reduced in the presence of 60, 150, and 250 g/L chabazite from 84 meq/L (1,180 mg/L) to 13 meq/L (184 mg/L), 7.7 meq/L (107 mg/L), and 3.8 meq/L (53 mg/L), respectively, after ion exchange. The growth of algae in these reactors during Phase 1 further reduced the aqueous $NH_4^+$—N concentrations to 37.6 mg/L, 10.5 mg/L, and 5.5 mg/L, respectively. Harvesting algae and recycling the supernatant for Phase 2 cultivation resulted in an overall decrease in cation concentrations. The increase in pH from 7.5 to 9.5-10.1 on day 9 likely induced the precipitation of $Ca^{2+}$ and $Mg^{2+}$, which contributed to this decrease. The increase in pH was mainly attributed to the algae growth. The ion-exchange process (ion exchange-control without algae) also increased pH but not as high as in the hybrid ion-exchange and algae photosynthesis reactors. All the hybrid ion-exchange and algae photosynthesis reactors with three chabazite dosages showed the similar trends. The

TABLE 2

Profiles of fatty acids of algae harvested in reactors from Phase 1 and Phase 3 growth.

| Fatty Acid* | Phase 1 | | | Phase 3 | | |
|---|---|---|---|---|---|---|
| | IA-60[†] | IA-150 | IA-250 | IA-60 | IA-150 | IA-250 |
| C16:0 (Palmitic Acid) | 23% | 23% | 23% | 26% | 25% | 24% |
| C16:1 Total (Palmitoleic Acid + isomers) | 6% | 5% | 5% | 4% | 5% | 5% |
| C16:4 (Hexadecatetraenoic Acid) | 2% | 2% | 1% | 0% | 0% | 0% |
| C18:0 (Stearic Acid) | 1% | 2% | 1% | 1% | 1% | 1% |
| C18:1, Total (Oleic Acid + isomers) | 19% | 22% | 19% | 11% | 12% | 13% |
| C18:2, Total (Linoleic Acid + isomers) | 28% | 28% | 30% | 47% | 45% | 41% |
| C18:3, Total (Linolenic Acid + isomers) | 18% | 14% | 16% | 8% | 10% | 12% |
| Other Fatty Acids | 3% | 4% | 5% | 3% | 2% | 4% |
| Total Monounsaturated Fatty Acids | 21% | 24% | 22% | 15% | 16% | 17% |
| Total Polyunsaturated Fatty Acids | 46% | 43% | 46% | 54% | 54% | 53% |
| Total Saturated Fatty Acids | 27% | 28% | 26% | 30% | 29% | 29% |
| Total Trans Fatty Acid | 6% | 6% | 5% | 1% | 1% | 1% |
| C16:0 (Palmitic Acid) | 23% | 23% | 23% | 26% | 25% | 24% |

* Fatty acid percentages are given as percent of total fatty acids.
[†]IA-60. IA-150, and IA-250 indicate data obtained from algae harvested from reactors charged with 60 g/L, 150 g/L, and 250 g/L chabazite, respectively.

The reactor performance in terms of $NH_4^+$—N removal and biomass production for reactors run through three overall cation concentrations decreased during Phase 2. Note that there were also slight decreases of $Na^+$ during Phase 2, which may be due to the lack of $K^+$ in the liquid phase and algae biomass beginning to take up $Na^+$ from surrounding solutions (Barber and Shieh, 1973). Algae showed a favorable uptake of $K^+$ over $Na^+$, and algae can also accumulate high $Na^+$ in the biomass (Schaedle and Jacobson, 1965; 1967).

The addition of chabazite decreased the ammonia toxicity to algae. Algae biomass (in terms of measured VSS) in all the hybrid ion-exchange and algae photosynthesis reactors increased from 500 mg/L to over 1500 mg/L after 8 days (FIG. 8). However, the control reactor without the addition of chabazite showed an inhibition of algae growth due to the high concentrations of $NH_{4+}$ in the influent. The algae showed immediate growth during Phase I due to the relative high $NH_{4+}$—N concentrations in the liquid phase 184 mg/L, 107 mg/L and 53 mg/L for IA-60, IA-150 and IA-250, respectively. However, during Phase 2 and Phase 3, longer lag period for the algae growth was required. The total biomass harvested from the reactors charged with 60 g/L, 150 g/L, and 250 g/L was 1587 mg, 1248 mg and 1187 mg, respectively. The data show that increased biomass was harvested from the reactor with lower chabazite charging level or dose. The supernatant was recycled in the reactors during Phases 2 and 3, and thus there was likely to be a lower concentration of cations available for ion-exchange with $NH_4^+$ in the solid phase. Introducing new influent with selective cations and creating a concentration gradient between the liquid and solid phase may increase the selective reversal $NH_4^+$ desorption to the liquid phase.

Figures 9A, 9B:
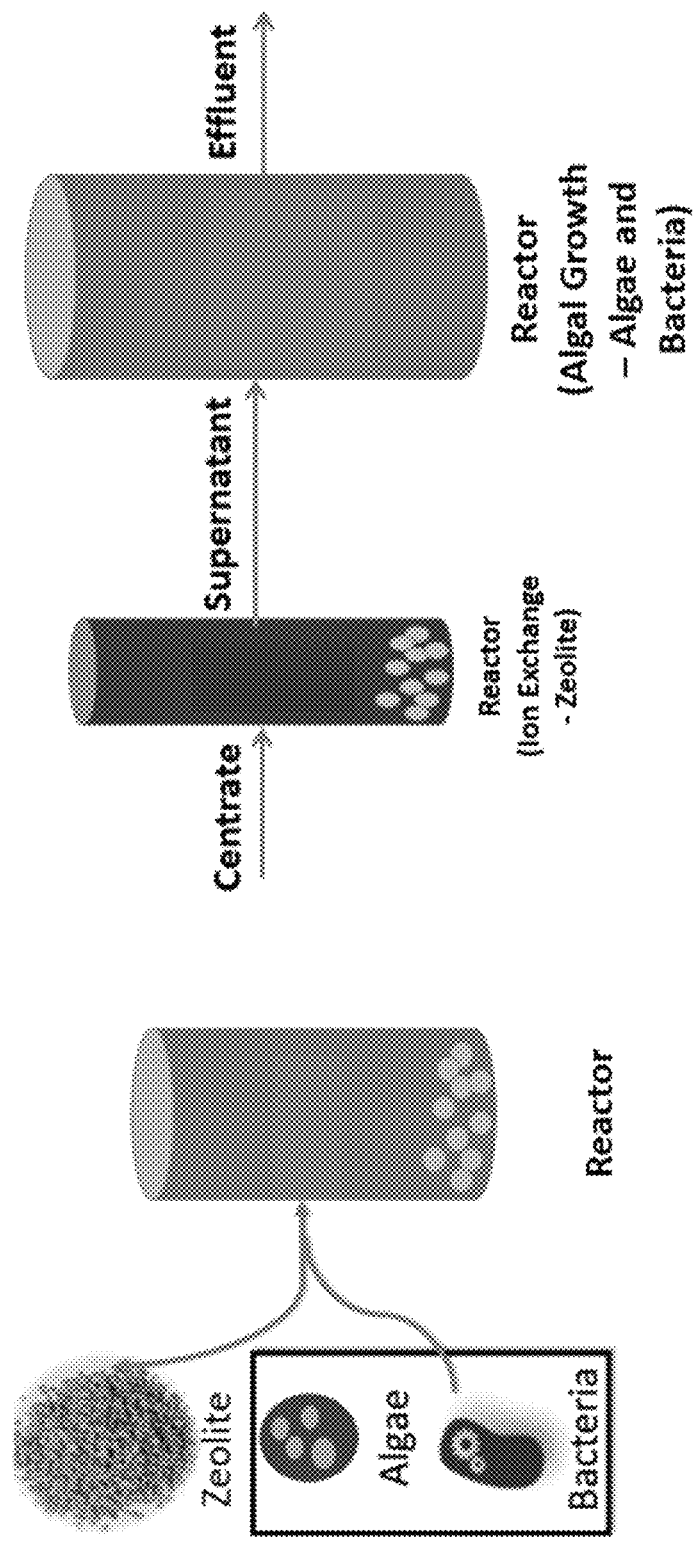
FIGS. 9A-9B show schematic diagrams for representative disclosed processes and systems.
Figure 10:
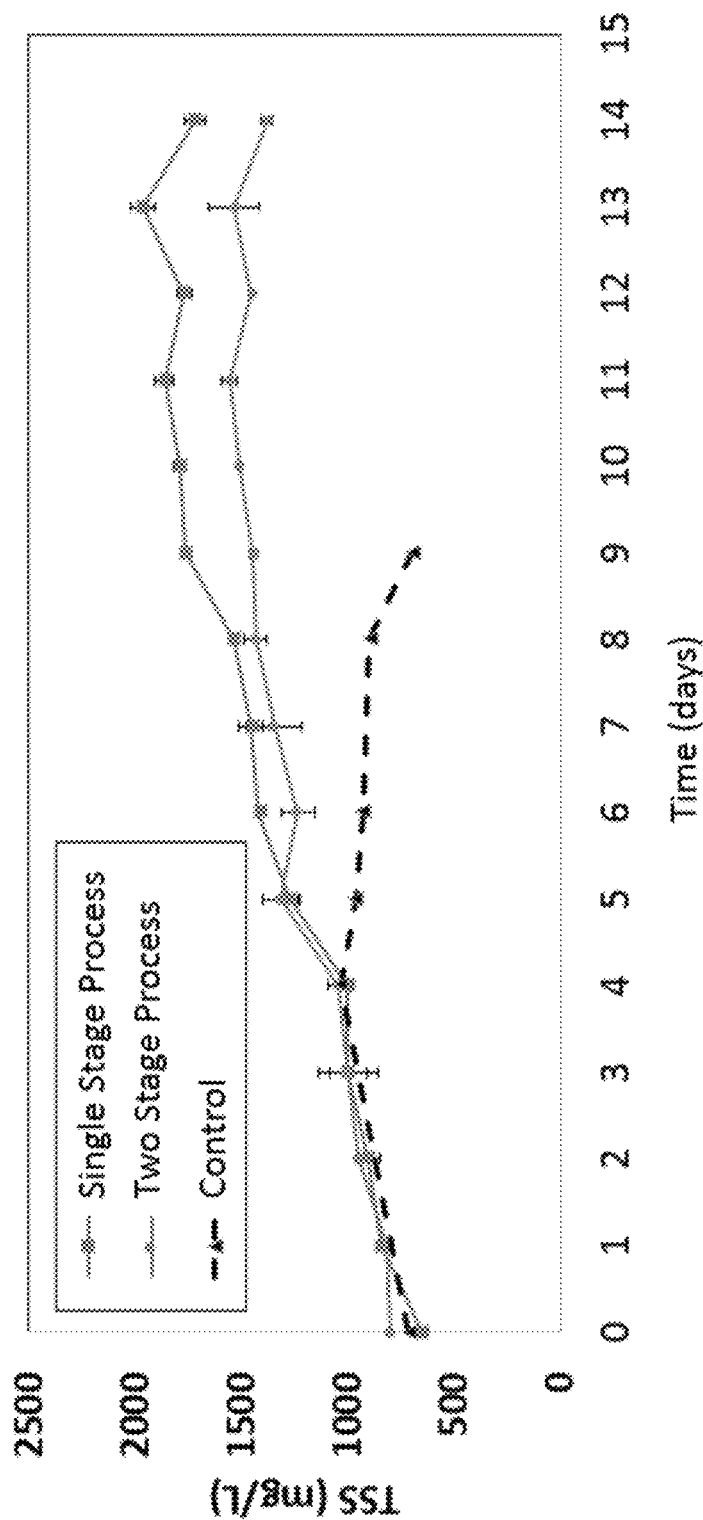
FIG. 10 shows representative data for the level of total suspended solids (TSS) obtained in representative one stage and two-stage processes (as exemplified in FIGS. 9A-9B), comprising 60 g/L chabazite and treated with an algal/bacterial inoculum as discussed for the one stage and two-stage processes. The TSS obtained in these representative disclosed processes are compared to a control process comprising treatment of a centrate sample with the same algal/bacterial inoculum, but without treatment with any ion exchange material.
Figure 11A:
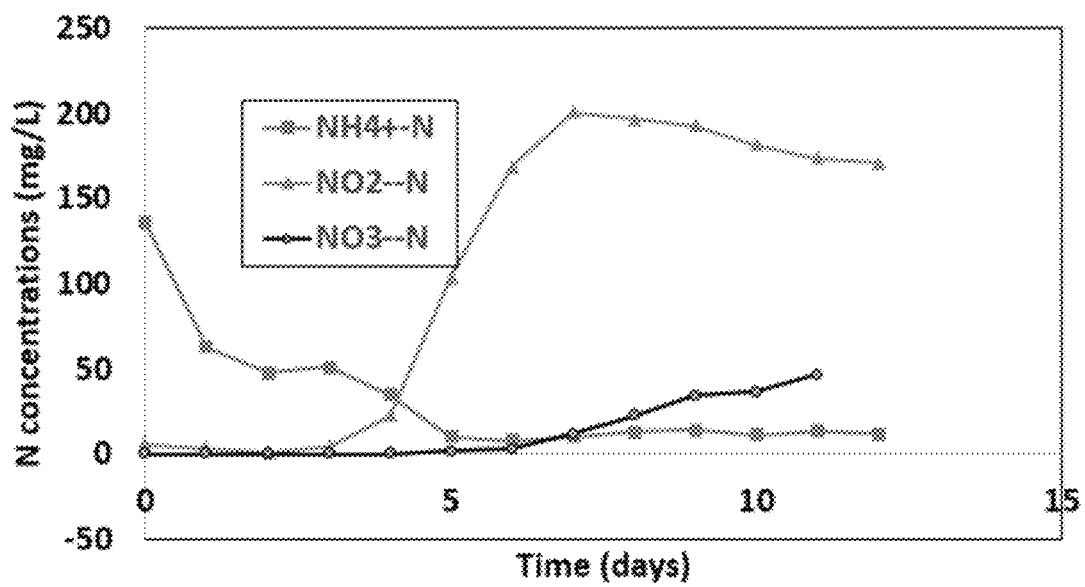
FIGS. 11A-11B show representative data for the levels of inorganic nitrogen as determined from the $NO_2^-$ and $NO_3^-$ concentrations present.
Figure 11B:
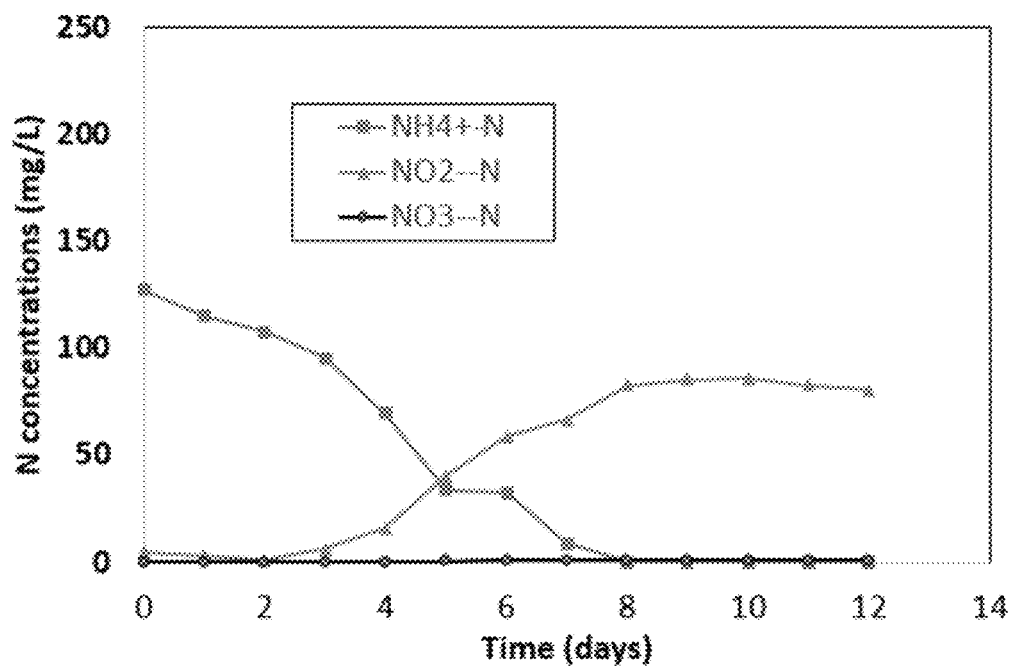

Hybrid Ion-exchange and Algae Photosynthesis Process Performance (One- vs. Two-Stage Processes). A representative one-stage and two-stage process is shown in FIGS. 9A-9B. In the systems tested, chabazite was used at a concentration of 60 g/L in either the single-stage process or the first stage of the two-stage process. In both systems, an algae/bacterial consortium was used during inoculation step. The data were compared to a control process comprising inoculation with the same algae/bacterial consortium, but without any exposure to chabazite. The data in FIG. 10 shows that algae growth was inhibited when chabazite was absent. The data further show that growth in a disclosed single-stage hybrid ion-exchange and algae photosynthesis process yielded greater biomass production than compared to a similar process that involved two-stages. The data in FIGS. 11A and 11B show data for the levels of inorganic nitrogen in the aqueous phase after removal of chabazite and microorganisms for a disclosed single-stage hybrid ion-exchange and algae photosynthesis process yielded greater biomass production compared to a similar process that involved two-stages, respectively. In the single-stage process, the levels of both nitrite and nitrate were greater after 10 days of growth compared to the initial nitrite or nitrate concentrations (FIG. 11A). The data in FIG. 11B show that the level of nitrite was greater after 10 days of growth compared to the initial nitrite concentration. These data show the show the effect on the process when the inoculum comprises not only algae, but also one or more ammonia oxidizing and nitrite oxidizing microorganisms. The data in FIG. 11A are consistent with release of $NH_4^+$—N from the chabazite. In contrast, the two-stage process (see FIG. 11B) showed a lower level of $NH_4^+$—N in the effluent (<1 mg/L).

Mathematical Model Development. A mathematical model was developed to assess aspects ion exchange by surface diffusion combined with algal photosynthesis describes $NH_4^+$ removal efficiency and biomass production in the disclosed reactors. A conceptual model of the process is shown in FIG. 1. The model considers the limiting diffusion process as intraparticle surface diffusion, which is characterized by probabilistically rare hops of ions between ion exchange sites in the zeolitic framework (Auerbach, S. M., et al., Handbook of Zeolite Science and Technology. 2003: CRC press). The homogeneous surface diffusion model (HSDM), a Fickian-based model that has been used successfully in previous studies to model ion exchange kinetics (Lee, E. and Q. Zhang, Algal Research, 2016. 18:15-24), was adopted as the intraparticle diffusion model. At the chabazite-liquid interface, an ion exchange isotherm model based on a homogenous mass action law establishes the relationship between the $NH_4^+$ concentration in the solid and aqueous phase (Crittenden, J. C., et al., MWH's water treatment: principles and design. 2012: John Wley & Sons). The HSDM neglects electrostatic interactions and assumes the surface diffusive flux is controlled by a concentration gradient based Fick's first law of diffusion. Nevertheless, the HSDM captures the IX kinetics within chabazite between the co-ionic species $NH_4^+$ and $Na^+$ (Lee, E. and Q. Zhang, Algal Research, 2016. 18:15-24.

Microalgae carry out oxygenic photosynthesis, which is a light-dependent process whereby energy harvested from light is converted into a chemical form. Therefore, light is one of the key limiting factors to algal growth in addition to $CO_2$, N, and P. Recently, a co-limitation kinetic model based on limitation due to N, $CO_2$, light, and temperature was developed and provided a reasonable growth prediction rate in comparison to experimental Chlorella growth data (Lee, E. and Q. Zhang, Algal Research, 2016. 18:15-24. In the model, N, light and temperature were considered as the co-limiting factors given the reactor configuration and centrate composition, which is abundant in P. It has been shown previously that for $NH_4^+$—N concentrations ≤150 mg $L^{-1}$, co-limitation without inhibition is an appropriate assumption (Lee, E. and Q. Zhang, Algal Research, 2016. 18:15-24. Therefore, we adopted a Monod expression for the N utilization rate with endogenous decay. Light and temperature factors were expressed with the Chalker model combined with the Arrhenius equation, which leads to the following rate equation:

$$r_A = \frac{\mu_{max} C_{NH_4^+} X_A}{Y_A(K_{S,NH_4^+} + C_{NH_4^+})} * \theta^{(T-20)} \tanh(I_{av}/I_k) \quad (1)$$

where $\mu_{max}(d^{-1})$ is the maximum specific growth rate, $X_A$ (g $L^{-1}$) is the algal biomass concentration, $Y_A$ is the yield coefficient, $K_{S,NH_{4+}}$ (meq $L^{-1}$) is the half saturation constant, $\theta$ is the Arrhenius growth coefficient, $I_k$ (μmol photon $m^{-2}$ $d^{-1}$) is the light half saturation coefficient, T is temperature (° C.), and $I_{av}$ (μmol photon $m^{-2}$ $d^{-1}$) is the average irradiance. The average irradiance term, $I_{av}$ (μmol photon $m^{-2}$ $d^{-1}$), is included to account for attenuation in the reactor, caused by self-shading by algal biomass and is given by:

$$I_{av} = \frac{I_0}{kdX_A} 1 - \exp(-kdX_A) \quad (2)$$

where $I_0$ (μmol photon $m^{-2}$ $d^{-1}$) is the incident light intensity, k ($m^2$ $g^{-1}$) is the attenuation coefficient, and d (m) is the reactor diameter. Assuming the temporal dynamics of the aqueous phase $NH_4^+$—N concentration is driven by IX and algal photosynthesis, we combined the rate expression (Eq.

1) with a Fickian surface diffusion flux term to get the following expression for the aqueous phase $NH_4^+$—N concentration:

$$\frac{dC_{NH_4^+}}{dt} = -\frac{3M}{RV}D_s\frac{\partial q_{NH_4^+}}{\partial r}\bigg|_{r=R} - \frac{\mu_{max}C_{NH_4^+}X_A}{Y_A(K_{S,NH_4^+} + C_{NH_4^+})} * \theta^{(T-20)}\tanh(I_{av}/I_k) \quad (3)$$

where $D_S$ ($m^2\ d^{-1}$), M (g) is the mass of zeolite, $q_{NH_4^+}$ (meq $g^{-1}$) is the solid-phase $NH_4^+$ concentration R (m) is the chabazite particle radius, V is the volume of liquid (L). The phototrophic biomass growth rate is given by the expression:

$$\frac{dX_A}{dt} = \frac{\mu_{max}C_{NH_4^+}X_A}{Y_A(K_{S,NH_4^+} + C_{NH_4^+})} * \theta^{(T-20)}\tanh(I_{av}/I_k)Y_A \quad (4)$$

This hybrid ion-exchange and algae photosynthesis systems and processes disclosed herein can be used for high $NH_4^+$—N side stream treatment. Moreover, the disclosed novel hybrid algal photosynthesis and ion-exchange systems and processes can be used to recover nutrients from high $NH_4^+$—N strength wastewater. In various aspects, without wishing to be bound by a particular theory, it is believed that $NH_4^+$ in the wastewater can be absorbed by the zeolite and exchanged with cations such as $Na^+$ and $K^+$. In a further aspect, without wishing to be bound by a particular theory, it is believed that adsorption of $NH_4^+$ will reduce free $NH_3$ concentrations in the liquid phase to below inhibitory levels for algae growth. In a still further aspect, without wishing to be bound by a particular theory, it is believed that as algae utilize $NH_4^+$ in solution, $NH_4^+$ stored in the zeolite will be slowly released, allowing for additional algal biomass production while regenerating the ion exchange capacity of the zeolite. The hybrid ion-exchange and algae photosynthesis process serves a two-fold purpose for removal of high strength $NH_4^+$—N wastewater and the potential for biofuel, and commercial biopolymer production. The zeolite dose on system performance can be optimized used the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

That which is claimed is:

1. A process for wastewater treatment, the process comprising mixing the wastewater with cation exchange particles and an algae inoculum in a single reactor, wherein the cation exchange particles and algae inoculum are suspended in the wastewater.

2. The process of claim 1, wherein the process is carried out in a bioreactor; and wherein the bioreactor is a photobioreactor.

3. The process of claim 2, wherein the photobioreactor comprises one or more light sources in the visible light spectrum.

4. The process of claim 3, wherein the light source is configured to provide at least one light/dark cycle.

5. The process of claim 3, wherein the light source emits at an illumination density of about 50 µmol/m²/sec to about 1000 µmol/m²/sec.

6. The process of claim 2, wherein the photobioreactor comprises exposure to natural sun light.

7. The process of claim 1, wherein the algae inoculum comprises at least one *Chlorella* sp.

8. The process of claim 7, wherein the least one *Chlorella* sp. is an isolated *Chlorella* sp.

9. The process of claim 8, wherein the algae inoculum consists essentially of least one isolated *Chlorella* sp.

10. The process of claim 7, wherein the at least one *Chlorella* sp. is a consortium of two to five independently selected *Chlorella* sp.

11. The process of claim 7, wherein the algae inoculum further comprises at least one species selected from *Acaryochloris* sp., *Amphora* sp., *Anabaena* sp., *Anacystis* sp., *Anikstrodesmis* sp., *Asteromonas* sp., *Azoarcus* sp., *Bacillus* sp., *Botryococcus* sp., *Chaetoceros* sp., *Chlorococcum* sp., *Closterium* sp., *Crocosphaera* sp., *Cyanotheca* sp., *Cyclotella* sp., *Cylindrotheca* sp., *Desmodesmus* sp., *Dunaliella* sp., *Escherichia* sp., *Euglena* sp., *Halobacterium* sp., *Halomonas* sp., *Halospirulina* sp., *Hematococcus* sp., *Isochrysis* sp., *Lyngbya* sp., *Marinichlorella* sp., *Micratinium* sp., *Microcystis* sp., *Monochrysis* sp., *Monoraphidium* sp., *Nannochloris* sp., *Nannochlorum* sp., *Nannochloropsis* sp., *Navicula* sp., *Nephrochloris* sp., *Nephroselmis* sp., *Nitrobacter* sp., *Nitrococcus* sp., *Nitrosococcus* sp., *Nitrosomonas* sp., *Nitrosopumilus* sp., *Nitrospina* sp., *Nitzschia* sp., *Nodularia* sp., *Nostoc* sp., *Oochromonas* sp., *Oocystis* sp., *Oscillatoria* sp., *Pavlova* sp., *Pediastrum* sp., *Phaeodactylum* sp., *Picochlorum* sp., *Platymonas* sp., *Pleurochrysis* sp., *Porphyra* sp., *Prochlorococcus* sp., *Pseudoanabaena* sp., *Pseudomonas* sp., *Pyramimonas* sp., *Rhodoceros* sp., *Rhodocyclus* sp., *Rhodomonas* sp., *Rubrivivax* sp., *Scenedesmus* sp., *Selenastrum* sp., *Spirulina*, *Stichococcus* sp., *Synechococcus* sp., *Synechocystis* sp., *Tetraselmis* sp., *Thalassiosira* sp., *Thermosynechocystis* sp., *Trichodesmium* sp., *Thiobacillus* sp., *Uronema* sp., and *Zoogloea* sp.

12. The process of claim 1, wherein the cation exchange particles bind or adsorb ammonium ions.

13. The process of claim 12, wherein the cation exchange particles are zeolite.

14. The process of claim 13, wherein the zeolite is chabazite.

15. The process of claim 13, wherein the zeolite has a $SiO_2/Al_2O_3$ molar ratio of less than or equal to about 10.

16. The process of claim 13, wherein the zeolite is present in amount of about 30 g/L to about 300 g/L.

17. The process of claim 13, wherein the zeolite comprises chabazite, clinoptilite, erionite, mordenite, or any combination thereof.

18. The process of claim 13, wherein the zeolite has a particle size of about 100 µm to about 2,500 µm.

19. The process of claim 1, wherein $NH_4^+$—N concentration in the wastewater is about 100 mg/L to about 2000 mg/L.

\* \* \* \* \*